United States Patent
Kawaguchi et al.

(10) Patent No.: US 8,812,204 B2
(45) Date of Patent: Aug. 19, 2014

(54) OIL PUMP CONTROL APPARATUS OF VEHICLE

(75) Inventors: Takateru Kawaguchi, Susono (JP);
Shigeki Shimanaka, Hadano (JP)

(73) Assignees: JATCO Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 735 days.

(21) Appl. No.: 12/898,093

(22) Filed: Oct. 5, 2010

(65) Prior Publication Data

US 2011/0082630 A1    Apr. 7, 2011

(30) Foreign Application Priority Data

Oct. 6, 2009 (JP) ................................. 2009-232453

(51) Int. Cl.
*B60W 10/10*    (2012.01)

(52) U.S. Cl.
USPC ......... 701/58; 192/85.01; 192/85.61; 701/51; 701/55

(58) Field of Classification Search
USPC ............. 192/85.01, 85.61; 701/51, 54, 55, 58
See application file for complete search history.

(56) References Cited

U.S. PATENT DOCUMENTS

| | | | | |
|---|---|---|---|---|
| 5,474,428 A | * | 12/1995 | Kimura et al. | 417/16 |
| 6,275,759 B1 | * | 8/2001 | Nakajima et al. | 701/54 |
| 6,390,947 B1 | * | 5/2002 | Aoki et al. | 477/3 |
| 6,463,375 B2 | * | 10/2002 | Matsubara et al. | 701/54 |
| 6,769,502 B2 | | 8/2004 | Nakamori et al. | |
| 2002/0107103 A1 | * | 8/2002 | Nakamori et al. | 475/116 |
| 2003/0148850 A1 | * | 8/2003 | Tomohiro et al. | 477/3 |
| 2003/0171868 A1 | * | 9/2003 | Morishita et al. | 701/54 |
| 2008/0296124 A1 | * | 12/2008 | Schiele et al. | 192/85 R |

FOREIGN PATENT DOCUMENTS

EP    2 055 997 A2    5/2009
JP    2002-206634 A    7/2002

* cited by examiner

*Primary Examiner* — Stephen Holwerda
(74) *Attorney, Agent, or Firm* — Foley & Lardner LLP

(57) ABSTRACT

In an oil pump control apparatus of a vehicle includes a first driving power source for propelling the vehicle, a first oil pump driven by the first driving power source, a second oil pump driven by a second driving power source, and a hydraulically-operated portion supplied with working oil from the first and second pumps, a look-ahead vehicle speed estimation section is provided for estimating, based on a vehicle running condition, a look-ahead vehicle speed, which may occur a given elapsed time later. Also provided is a second-oil-pump control section configured to predict, based on the look-ahead vehicle speed, whether a lack in discharge pressure produced by the first pump from a required hydraulic pressure, and further configured to start up the second pump, when it is predicted that a lack in discharge pressure of the first pump from the required hydraulic pressure occurs.

7 Claims, 6 Drawing Sheets

OIL PUMP CONTROL APPARATUS OF VEHICLE

TECHNICAL FIELD

The present invention relates to an oil pump control apparatus of a vehicle, configured to control switching between operative and inoperative states of a sub oil pump in combination with a main oil pump, so as to compensate for a lack in discharge pressure of the main oil pump.

BACKGROUND ART

In recent years, there have been proposed and developed various oil pump control system equipped automotive vehicles in which a sub oil pump (e.g., an electric-motor-driven oil pump) is utilized to compensate for a lack in discharge pressure of a main oil pump (e.g., a mechanical oil pump driven by a driving power source). For instance, when a pressure level of hydraulic pressure needed for friction engagement elements of an automatic transmission reduces to below a given pressure value or when a revolution speed of the driving power source reduces to below a given speed value, the oil pump control system is configured to start up the sub oil pump (the electric-motor-driven oil pump). One such oil pump control system has been disclosed in Japanese Patent Provisional Publication No. 2002-206634 (hereinafter is referred to as "JP2002-206634"), corresponding to U.S. Pat. No. 6,769,502, issued on Aug. 3, 2004.

SUMMARY OF THE INVENTION

However, in the oil pump control system as disclosed in JP2002-206634, informational data about friction-engagement-elements hydraulic pressure and driving-source revolution speed are detected every predetermined sampling time intervals (every execution cycles of the oil pump control routine executed as time-triggered interrupt routines), and then the input information in real time is compared to a given value. The oil pump control system is configured to start up the electric-motor-driven oil pump, when the input information reduces to below the given value (i.e., the previously-noted given pressure value or the previously-noted given speed value). Suppose that, as the given value, a threshold value for determining a lack in discharge pressure of the mechanical oil pump is set. In such a case, during a rapid deceleration that a rapid discharge-pressure drop in the mechanical oil pump occurs, the electric-motor-driven oil pump cannot be started up until such time that the input information reaches the given value (i.e., the threshold value for determining a lack in discharge pressure of the mechanical oil pump). This leads to the drawback that there is an undesirable lag in a hydraulic pressure build-up of working oil discharged from the electric-motor-driven oil pump, in other words, a lag in hydraulic pressure supply, that is, a lack in hydraulic pressure to be supplied to the friction engagement elements of the transmission, in particular during a rapid deceleration.

To avoid such a lack in supply hydraulic pressure during a rapid deceleration condition, suppose that, as the given value, a summed value (i.e., a given high pressure value or a given high speed value), obtained by adding a pressure-drop margin to a threshold value needed to determine a lack in discharge pressure of the mechanical oil pump, is set. In such a case, even during a moderate deceleration condition differing from a rapid deceleration condition and having a less tendency of a lack in supply hydraulic pressure, the electric-motor-driven oil pump would be started up at an undesirably earlier time as soon as the input information reduces to below the given value (i.e., the given high pressure value or the given high speed value). This leads to the drawback of unnecessary electric power consumption and deteriorated energy efficiency.

It is, therefore, in view of the previously-described disadvantages of the prior art, an object of the invention to provide an oil pump control apparatus of a vehicle, configured to prevent a sub oil pump (a second oil pump) from being wastefully driven even during a moderate vehicle deceleration condition with a moderate discharge-pressure drop in a main oil pump (a first oil pump), and further configured to prevent a lack in hydraulic pressure to be supplied to a hydraulically-operated portion that is supplied with working oil even during a rapid vehicle deceleration condition with a rapid discharge-pressure drop in the main oil pump.

In order to accomplish the aforementioned and other objects of the present invention, an oil pump control apparatus of a vehicle comprises a first driving power source for propelling the vehicle, a first oil pump driven by the first driving power source, a second oil pump driven by a second driving power source, a hydraulically-operated portion that is supplied with working oil from the first and second oil pumps, a look-ahead vehicle speed estimation section for estimating, based on a running condition of the vehicle, a look-ahead vehicle speed, which may occur a given elapsed time later, and a second-oil-pump control section configured to predict, based on the look-ahead vehicle speed, whether a lack in discharge pressure produced by the first oil pump driven by the first driving power source from a required hydraulic pressure needed for the hydraulically-operated portion occurs, and further configured to start up the second oil pump, when it is predicted that a lack in discharge pressure of the first oil pump from the required hydraulic pressure occurs.

The other objects and features of this invention will become understood from the following description with reference to the accompanying drawings.

DESCRIPTION OF THE PREFERRED EMBODIMENTS

First Embodiment

Figure 1:
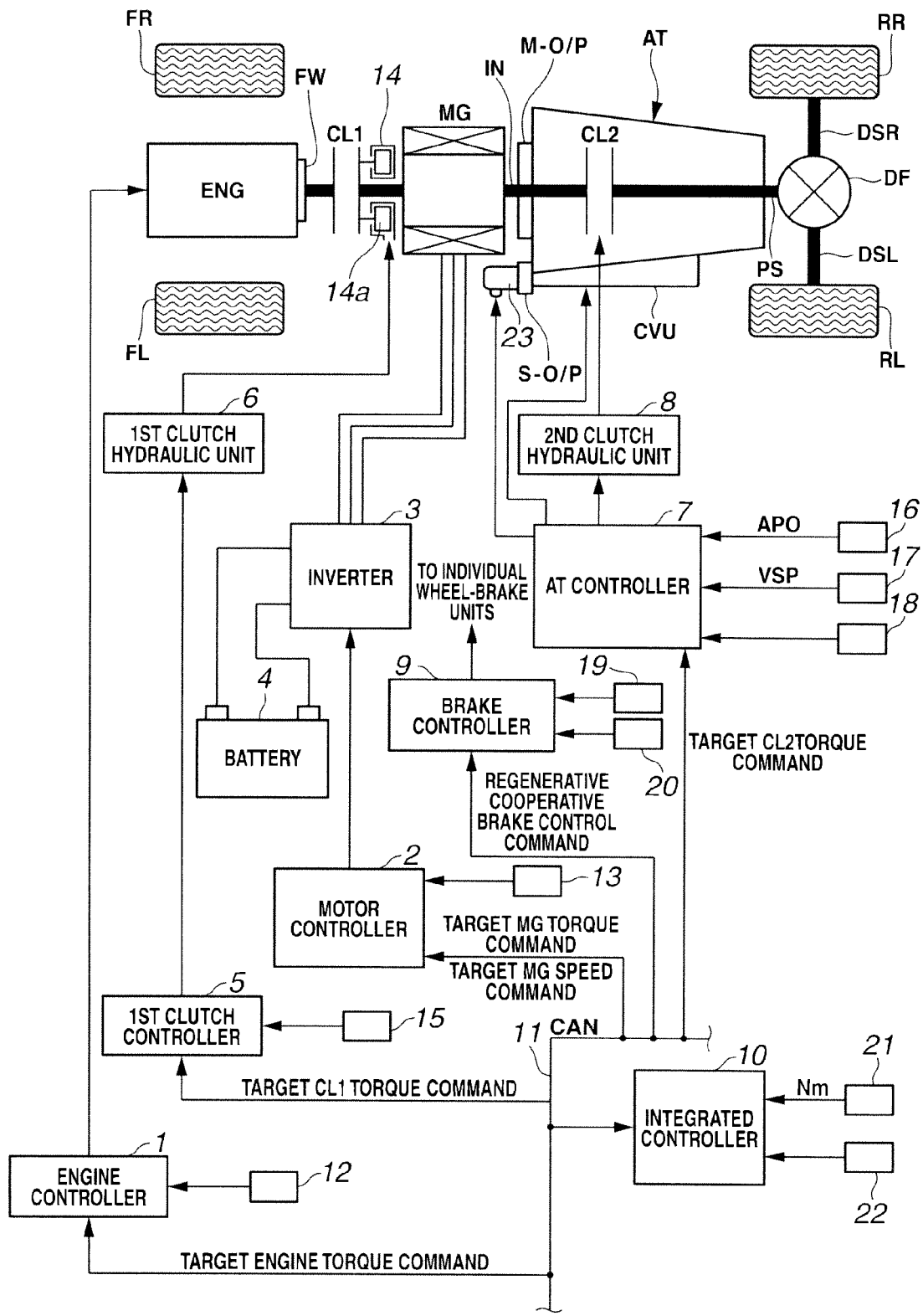
FIG. 1 is a system diagram illustrating a front-engine rear-drive hybrid electric vehicle to which an oil pump control apparatus of the first embodiment is applied.

Referring now to the drawings, particularly to FIG. 1, the oil pump control apparatus of the first embodiment is exemplified in a front-engine rear-drive (FR) hybrid electric vehicle.

As shown in FIG. 1, a drive train (a power train) of the FR hybrid electric vehicle, to which the control apparatus of the first embodiment is applied, includes an engine ENG (a first driving power source), a flywheel FW, a first clutch CL1 (a friction engagement element), a motor/generator MG (a first driving power source), an input shaft IN (a rotating member), a mech. oil pump M-O/P (a first oil pump, a mechanical oil pump), a sub oil pump S-O/P (a second oil pump, an electric-motor-driven oil pump), a second clutch CL2 (a friction engagement element), an automatic transmission AT, a propeller shaft PS, a differential DF, a left axle driveshaft DSL, a right axle driveshaft DSR, a rear-left road wheel RL (a drive wheel), and a rear-right road wheel RR (a drive wheel). In FIG. 1, a component part, denoted by "FL" is a front-left road wheel, whereas a component part, denoted by "FR" is a front-right road wheel.

The engine ENG is a gasoline engine or a diesel engine. Various engine control actions, namely, automatic engine-restart control, automatic engine-stop control, throttle-valve opening control, fuel-cutoff control, and the like are performed based on respective engine control commands generated from an engine controller 1. Flywheel FL is attached to the rear end of the engine output shaft (the crankshaft of engine ENG).

First clutch CL1 is a clutch interleaved between engine ENG and motor/generator MG. Engagement/slip-engagement (half-clutch state)/disengagement of first clutch CL1 is controlled by a first-clutch control hydraulic pressure produced by a first-clutch hydraulic pressure unit 6 based on a first-clutch control command from a first clutch controller 5. As the first clutch CL1, the control system of the first embodiment uses a normally-closed dry single disc clutch in which a complete clutch-engagement state is held by the spring force of a diaphragm spring, and a degree of clutch-engagement from a slip-engagement state to a complete clutch-disengagement state is controlled by stroke control performed by a hydraulic actuator 14 having a piston 14a.

Motor/generator MG is a synchronous motor/generator in which a permanent magnet embedded rotor and a stator on which a stator coil (a current-carrying winding) is wound. The operation of motor/generator MG is controlled by applying a three-phase alternating current produced by an inverter 3 based on a control command from a motor controller 2. Motor/generator MG serves as an electric motor, which can be rotated by electric power supply from a battery 4. This working condition of motor/generator MG is often called "power-running". Motor/generator MG also serves as a generator in which the rotor receives rotational energy from engine ENG and drive wheels RL-RR and as a result an electromotive force is produced on both ends of the stator coil and whereby the battery 4 can be recharged. This working condition of motor/generator MG is often called "energy regeneration". The rotor of motor/generator MG is connected to the input shaft IN of automatic transmission AT.

Mech. oil pump M-O/P is a main oil pressure source, driven mechanically by the input shaft IN. Working oil discharged from mech. oil pump M-O/P is introduced into an AT hydraulic pressure control valve unit CVU, and then hydraulic pressure modulated or regulated by AT hydraulic pressure control valve unit CVU is supplied to each of a plurality of friction engagement elements built in automatic transmission AT for the automatic transmission control.

Sub oil pump S-O/P is provided as a subsidiary oil pressure source (in the presence of a lack in discharge pressure of mech. oil pump M-O/P), whose pumping action is created by energizing an electric motor 23 (a second driving power source), which motor is an electrical driving power source. Working oil discharged from sub oil pump S-O/P is introduced into the AT hydraulic pressure control valve unit CVU, and then hydraulic pressure modulated or regulated by AT hydraulic pressure control valve unit CVU is supplied to each of a plurality of friction engagement elements built in automatic transmission AT for the automatic transmission control.

Second clutch CL2 is a clutch interleaved between motor/generator MG and rear-left and rear-right road wheels RL-RR. Engagement/slip-engagement/disengagement of second clutch CL2 is controlled by a second-clutch control hydraulic pressure produced by a second-clutch hydraulic pressure unit 8 based on a second-clutch control command from an AT controller 7. As the second clutch CL2, the control system of the first embodiment uses a normally-open wet multiple disc clutch (or a normally-open wet multiple disc brake) in which a working-fluid flow rate and a hydraulic pressure can be continuously controlled by means of a proportional solenoid. First-clutch hydraulic pressure unit 6 and second-clutch hydraulic pressure unit 8 are built in the AT hydraulic pressure control valve unit CVU attached to automatic transmission AT.

The previously-noted automatic transmission AT is a stepped automatic transmission (for example, a seven-speed stepped transmission having seven forward speeds and reverse), whose number of speeds is limited or finite and switching among infinite shift stages (that is, upshifting or downshifting) is automatically controlled depending on vehicle speed and accelerator opening and the like. Second clutch CL2 is not an exclusive clutch (an additional clutch). Of a plurality of friction engagement elements selectively engaged at each of shift stages of automatic transmission AT, an optimal clutch (or optimal brake), arranged in a torque-transmission path, is selected as the second clutch CL2. The output shaft of automatic transmission AT is connected through propeller shaft PS, differential DF, and left and right axle driveshafts DSL-DSR to rear-left and rear-right road wheels RL-RR.

The drive train of the hybrid electric vehicle of the first embodiment is configured to provide a plurality of running modes, namely, an electric-vehicle (EV) mode, a hybrid electric vehicle (HEV) mode, and a driving-torque control start mode, often called "wet start clutch (WSC) mode".

In the "EV" mode, first clutch CL1 is kept disengaged. The "EV" mode corresponds to a mode in which the vehicle can be propelled in either a motor-propelled vehicle-running mode or a vehicle-running power (electrical energy) generation mode, utilizing only a power produced by motor/generator MG. In the "HEV" mode, first clutch CL1 is kept engaged. The "HEV" mode corresponds to a mode in which the vehicle can be propelled in either one of a motor-assist vehicle-running mode, a vehicle-running power (electrical energy) generation mode, and an engine-propelled vehicle-running mode. The "WSC" mode is a mode in which the vehicle can be started, while controlling a clutch torque capacity in such a manner as to bring a clutch-transmitted torque transmitted through second clutch CL2 closer to a required driving torque determined based on an engine/vehicle condition and a driver's operation, maintaining a slip-engagement state of second clutch CL2 by speed control for motor/generator MG when starting from a "HEV" mode with P, N→D range selection or when starting from either an "EV" mode or a "HEV" mode with D range selection.

The system configuration of the control system for the hybrid electric vehicle is hereunder described in detail.

As best seen in FIG. 1, the control system of the FR hybrid electric vehicle of the first embodiment includes engine controller 1, motor controller 2, inverter 3, battery 4, first clutch controller 5, first-clutch hydraulic pressure unit 6, AT controller 7, second-clutch hydraulic pressure unit 8, a brake controller 9, and an integrated controller 10. Each of engine controller 1, motor controller 2, first clutch controller 5, AT controller 7, and brake controller 9 is connected via a controller area network (CAN) communications line 11 to integrated controller 10.

Engine controller 1 receives input informational data, namely, an engine speed signal from an engine speed sensor 12, and a target engine torque command and other necessary information from integrated controller 10. Engine controller 1 is also configured to output a command needed to control an engine operating point (engine speed Ne, engine torque Te) of engine ENG to a throttle valve actuator of engine ENG.

Motor controller 2 receives input informational data, namely, information from a resolver 13 for detecting a rotational position of the rotor of motor/generator MG, and a target MG torque command and a target MG speed command and other necessary information from integrated controller 10. Motor controller 2 is also configured to output a command needed to control a motor operating point (motor speed Nm, motor torque Tm) of motor/generator MG to the inverter 3. Motor controller 2 is further configured to monitor a capacity of charge of battery 4 (often called "a state of charge (SOC)" of the battery). The battery SOC information is used as necessary information for motor/generator MG control. The battery SOC information is also supplied via CAN communications line 11 to the integrated controller 10.

First clutch controller 5 receives input informational data, namely, information from a first-clutch stroke sensor 15 for detecting a stroke position of the piston 14a of hydraulic actuator 14, and a target CL1 torque command and other necessary information from integrated controller 10. First clutch controller 5 is also configured to output a command needed to control engagement/slip-engagement (half-clutch state)/disengagement of first clutch CL1 to the first clutch hydraulic unit 6 built in AT hydraulic pressure control valve unit CVU.

AT controller 7 receives input informational data, namely, information from an accelerator opening sensor (an accelerator position sensor) 16, a vehicle speed sensor 17, and other engine/vehicle sensors 18. AT controller 7 is also configured to retrieve or determine an optimal shift stage depending on a position of an operating point, which point is determined based on an accelerator opening APO detected by accelerator opening sensor 16 and a vehicle speed VSP detected by vehicle speed sensor 17 and exists on a shift map, when the vehicle is running in the D range (the selected operating range). AT controller 7 is further configured to output a control command corresponding to the retrieved shift stage to the AT hydraulic pressure control valve unit CVU. The previously-noted shift map means a map on which upshift lines and downshift lines, which lines are dependent on accelerator opening APO and vehicle speed VSP, are written.

In addition to the previously-discussed automatic shift control, AT controller 7 is still further configured to execute second-clutch control according to which AT controller 7 outputs a command needed to control slip-engagement of second clutch CL2 to the second clutch hydraulic unit 8 built in AT hydraulic pressure control valve unit CVU, when receiving a target CL2 torque command from integrated controller 10. Furthermore, AT controller 7 is configured to control switching between operative and inoperative states of sub oil pump S-O/P in order to compensate for a lack in discharge pressure of mech. oil pump M-O/P.

Brake controller 9 receives input informational data, namely, information from wheel speed sensors for detecting wheel speeds of the four road wheels and a brake stroke sensor 20 for detecting a brake stroke BS, and a regenerative cooperative brake control command and other necessary information from integrated controller 10. In the presence of a shortage in braking force between a regenerative braking force and a required braking force determined based on the detected brake stroke BS when the brakes are applied with the brake pedal depressed, brake controller 9 executes regenerative cooperative brake control in order to compensate for such a shortage in braking force by a braking force produced by mechanical braking (hydraulic braking or motor braking).

Integrated controller 10 manages total energy consumption of the vehicle and has a function that enables the vehicle to run at the best efficiency. Integrated controller 10 receives input informational data, namely, a motor speed signal from a motor speed sensor 21 for detecting a motor speed Nm and necessary information from other engine/vehicle sensors/switches 22, and input information via CAN communications line 11. Integrated controller 10 is configured to output a target engine torque command to the engine controller 1, and configured to output a target MG torque command and a target MG speed command to the motor controller 2, and configured to output a target CL1 torque command to the first clutch controller 5, and also configured to output a target CL2 torque command to the AT controller 7, and further configured to output a regenerative cooperative brake control command to the brake controller 9.

Figure 2:
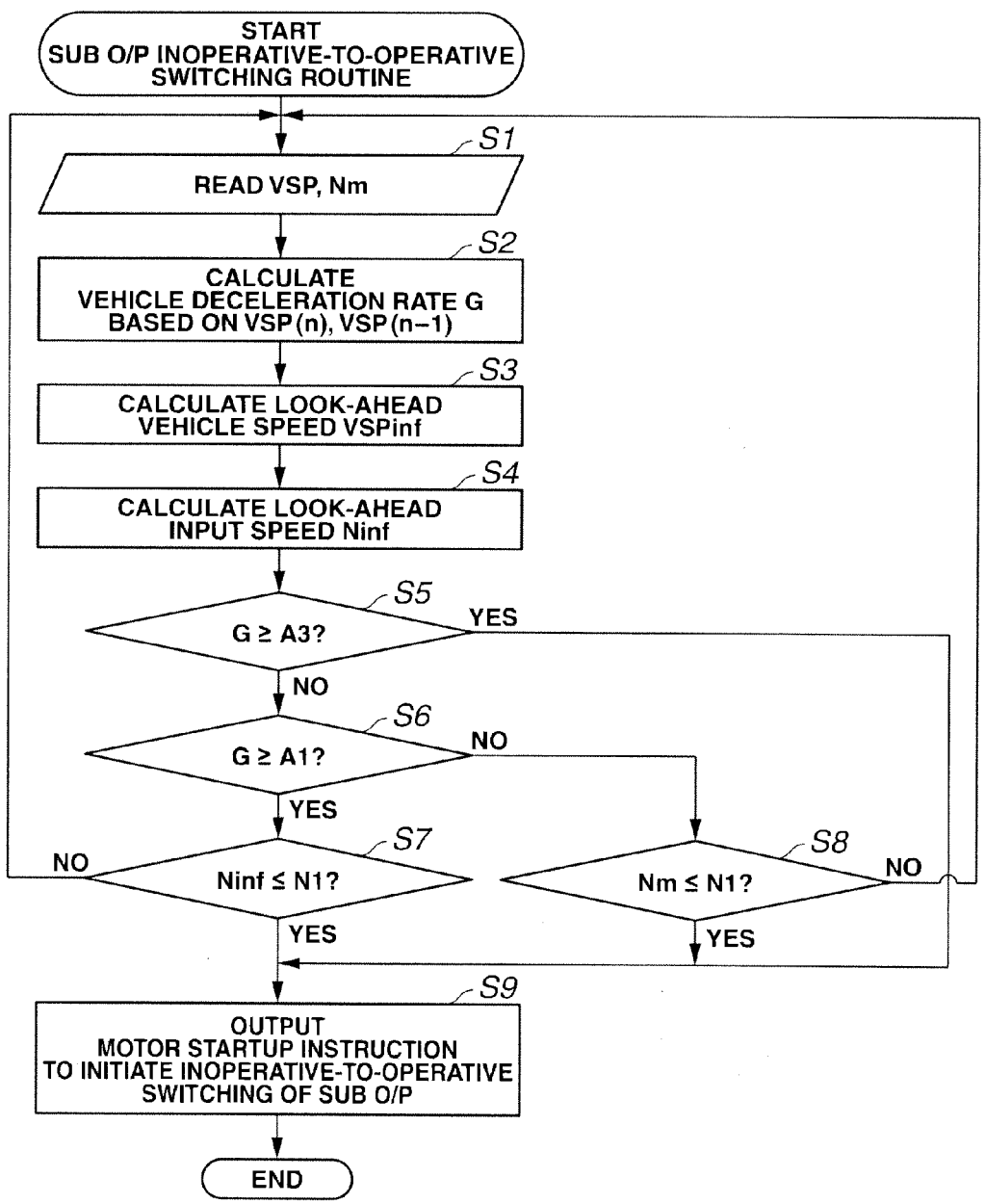
FIG. 2 is a flowchart illustrating a sub-oil-pump inoperative-to-operative switching routine of oil pump control processing executed within an automatic transmission (AT) controller incorporated in the control system of the first embodiment.

Referring now to FIG. 2, there is shown the flowchart illustrating a sub-oil-pump inoperative-to-operative switching routine (corresponding to look-ahead vehicle speed estimation means and second oil pump control means) of oil pump control processing executed within AT controller 7 incorporated in the control system of the first embodiment. Details of respective steps S1-S9 of the sub-oil-pump inoperative-to-operative switching routine are hereunder described in reference to the flowchart of FIG. 2. The routine of FIG. 2 is executed as time-triggered interrupt routines to be triggered every predetermined sampling time intervals.

At step S1, vehicle speed VSP from vehicle speed sensor 17 and motor speed Nm from motor speed sensor 21 are read. Thereafter, step S2 occurs.

At step S2, an infinite difference between a vehicle speed VSP(n) read at the current execution cycle and a vehicle speed VSP(n−1) read at the previous execution cycle (before one execution cycle) is arithmetically calculated by a differential operation, to obtain a vehicle deceleration rate G, and then step S3 occurs.

At step S3, a look-ahead vehicle speed VSPinf after a predetermined time has elapsed is arithmetically calculated and estimated based on the current vehicle speed VSP(n) and the calculated vehicle deceleration rate G, and then step S4 occurs. In the shown embodiment, the previously-noted predetermined time is set to a hydraulic pressure buildup equivalent time duration from a point of time when a motor startup instruction for sub oil pump S-O/P has been outputted to a point of time when the discharge pressure of sub oil pump S-O/P reaches a target hydraulic pressure.

At step S4, a look-ahead input speed Ninf of input shaft IN of automatic transmission AT is arithmetically calculated based on the calculated look-ahead vehicle speed VSPinf and a current transmission gear ratio (simply, a current transmission ratio) CurGP of automatic transmission AT, from the following expression. In arithmetically calculating the look-ahead input speed Ninf, as the information regarding a transmission gear ratio, the current transmission ratio CurGP is used without using a shift command transmission gear ratio NextGP or a control transmission gear ratio SftGP. Hence, in the case of the use of the current transmission ratio CurGP, the look-ahead input speed Ninf tends to become a lower transmission input speed, as compared to the use of shift command transmission gear ratio NextGP or control transmission gear ratio SftGP.

$$Ninf = VSPinf \times CurGP$$

At step S5 subsequently to step S4, a check is made to determine whether the vehicle deceleration rate G, calculated through step S2, is greater than or equal to a third set deceleration rate A3 (set as a rapid-deceleration decision threshold value needed to determine whether the vehicle enters a rapid deceleration condition). When the answer to step S5 is in the affirmative (YES), that is, when G≥A3, the routine proceeds to step S9. Conversely when the answer to step S5 is in the negative (NO), that is, when G<A3, the routine proceeds to step S6.

At step S6, a check is made to determine whether the vehicle deceleration rate G, calculated through step S2, is greater than or equal to a first set deceleration rate A1 (set as a look-ahead decision threshold value needed to determine whether the look-ahead input speed Ninf should be used rather than using an actual input speed (=motor speed Nm) corresponding to an actual revolution speed of input shaft IN of automatic transmission AT, in other words, a pump speed of mech. oil pump M-O/P), for the purpose of determining the timing of inoperative-to-operative switching of sub oil pump S-O/P. When the answer to step S6 is in the affirmative (YES), that is, when G≥A1, the routine proceeds to step S7. Conversely when the answer to step S6 is in the negative (NO), that is, when G<A1, the routine proceeds to step S8.

At step S7, under a condition defined by an inequality A1≤G<A3, a check is made to determine whether the look-ahead input speed Ninf, calculated through step S4, is less than or equal to a first set speed N1 (set as an under-developed pump discharge pressure decision threshold value needed to determine whether a lack in pump discharge pressure would occur). In other words, the first set speed N1 serves as an input speed threshold value for determining the timing of inoperative-to-operative switching of sub oil pump S-O/P.

When the answer to step S7 is in the affirmative (YES), that is, when Ninf≤N1, the routine proceeds to step S9. Conversely when the answer to step S7 is in the negative (NO), that is, when Ninf>N1, the routine returns to step S1.

At step S8, under a condition defined by an inequality G<A1, a check is made to determine whether an actual input speed (=motor speed Nm) corresponding to an actual revolution speed of input shaft IN of automatic transmission AT is less than or equal to the first set speed N1. When the answer to step S8 is in the affirmative (YES), that is, when Nm≤N1, the routine proceeds to step S9. Conversely when the answer to step S8 is in the negative (NO), that is, when Nm>N1, the routine returns to step S1.

At step S9, responsively to a decision result defined by G≥A3 at step S5, or a decision result defined by Ninf≤N1 at step S7, or a decision result defined by Nm≤N1 at step S8, a motor startup instruction for sub oil pump S-O/P is outputted and thus inoperative-to-operative switching of sub oil pump S-O/P occurs. In this manner, one execution cycle of the sub-oil-pump inoperative-to-operative switching routine ends.

Figure 3:
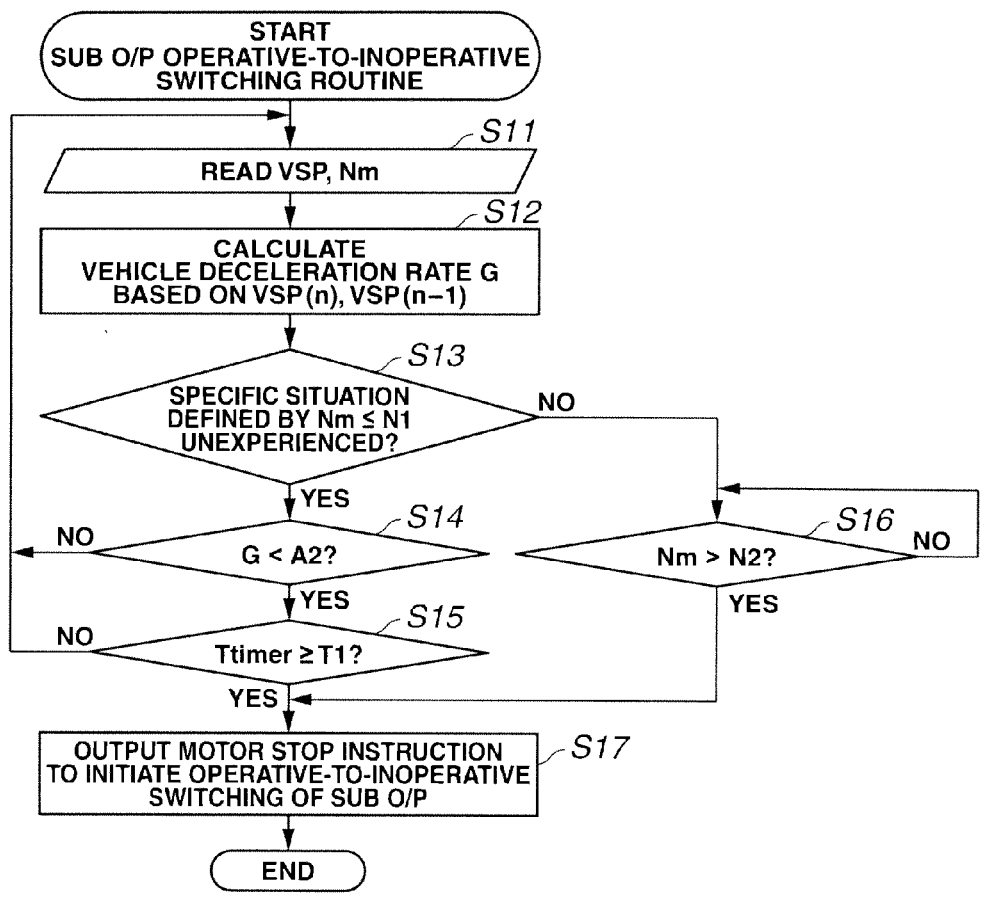
FIG. 3 is a flowchart illustrating a sub-oil-pump operative-to-inoperative switching routine of oil pump control processing executed within the AT controller incorporated in the control system of the first embodiment.

Referring now to FIG. 3, there is shown the flowchart illustrating a sub-oil-pump operative-to-inoperative switching routine (corresponding to the second oil pump control means) of oil pump control processing executed within AT controller 7 incorporated in the control system of the first embodiment. Details of respective steps S11-S17 of the sub-oil-pump operative-to-inoperative switching routine are hereunder described in reference to the flowchart of FIG. 3. The routine of FIG. 3 is also executed as time-triggered interrupt routines to be triggered every predetermined sampling time intervals.

At step S11, vehicle speed VSP from vehicle speed sensor 17 and motor speed Nm from motor speed sensor 21 are read. Thereafter, step S12 occurs.

At step S12, an infinite difference between a vehicle speed VSP(n) read at the current execution cycle and a vehicle speed VSP(n−1) read at the previous execution cycle (before one execution cycle) is arithmetically calculated by a differential operation, to obtain a vehicle deceleration rate G, and then step S13 occurs.

At step S13, a check is made to determine whether the vehicle does not yet experience a specific situation where an actual input speed (=motor speed Nm) corresponding to an actual revolution speed of input shaft IN of automatic transmission AT has become less than or equal to a first set speed N1 (set as an under-developed pump discharge pressure decision threshold value needed to determine whether a lack in pump discharge pressure would occur). When the answer to step S13 is in the affirmative (YES), that is, when the vehicle does not yet experience the specific situation defined by Nm≤Ni, the routine proceeds to step S14. Conversely when the answer to step S13 is in the negative (NO), that is, when the vehicle experiences the specific situation defined by Nm≤Ni, the routine proceeds to step S16. That is to say, in the case that inoperative-to-operative switching of sub oil pump S-O/P has occurred responsively to a decision result defined by Ninf≤N1 at step S7 in the routine of FIG. 2, the flow from step S13 to step S14 in the routine of FIG. 3 is continually repeated until such time that the specific situation defined by Nm≤Ni has been experienced.

At step S14, under a condition where the specific situation defined by N≤Ni has not yet been experienced, a check is made to determine whether the vehicle deceleration rate G, calculated through step S12, is less than a second set deceleration rate A2 (set as a non-deceleration condition decision threshold value needed to determine whether the vehicle is in a non-deceleration condition). When the answer to step S14 is in the affirmative (YES), that is, when G<A2, the routine proceeds to step S15. Conversely when the answer to step S14 is in the negative (NO), that is, when the G≥A2, routine returns to step S11.

At step S15, under a condition defined by G<A2, a check is made to determine whether a timer count value (simply, a timer value) Ttimer of a timer, which timer becomes started up from a point of time when the calculated vehicle deceleration rate G becomes less than the second set deceleration rate A2, is greater than or equal to a set timer value T1. When the answer to step S15 is in the affirmative (YES), that is, when Ttimer≥T1, the routine proceeds to step S17. Conversely when the answer to step S15 is in the negative (NO), that is, when Ttimer<T1, the routine returns to step S11.

At step S16, under a condition where the specific situation defined by Nm≤Ni has been experienced, a check is made to determine whether the actual input speed (=motor speed Nm) corresponding to the actual revolution speed of input shaft IN of automatic transmission AT exceeds a second set speed N2 (set as a pump stop decision threshold value needed to determine whether sub oil pump S-O/P should be stopped). When the answer to step S16 is in the affirmative (YES), that is, when Nm>N2, the routine proceeds to step S17. Conversely when the answer to step S16 in the negative (NO), that is, when Nm≤N2, step 16 is repeatedly executed with each execution of the sub-oil-pump operative-to-inoperative switching routine of FIG. 3 until such time that the actual input speed (=motor speed Nm) of input shaft IN of automatic transmission AT exceeds the second set speed N2.

At step S17, responsively to a decision result defined by Ttimer≥T1 at step S15, or a decision result defined by Nm>N2 at step S16, a motor stop instruction for sub oil pump S-O/P is outputted and thus operative-to-inoperative switching of sub oil pump S-O/P occurs. In this manner, one execution cycle of the sub-oil-pump operative-to-inoperative switching routine of FIG. 3 ends.

Details of the operation (in particular, sub-oil-pump inoperative-to-operative switching control action and sub-oil-pump operative-to-inoperative switching control action) of the oil pump control apparatus of the first embodiment, which is applied to the FR hybrid vehicle, are hereunder described in detail, while comparing with a point of concern of pump control (operative/inoperative switching based on an actual transmission input speed) of a comparative example.

[Point of Concern of Pump Control of Comparative Example]

According to pump control of the comparative example in which switching between operative and inoperative states of a sub oil pump in combination with a mech. oil pump is controlled to compensate for a lack in discharge pressure of the mech. oil pump, immediately when an automatic transmission input speed (an actual transmission input speed corresponding to a revolution speed of the mech. oil pump) reaches an input speed within a given low speed range in which it is impossible to ensure a required hydraulic pressure by means of only the mech. oil pump, the sub oil pump becomes started up so as to ensure the required hydraulic pressure. Thereafter, immediately when, with the sub oil pump kept operative, the transmission input speed (an actual transmission input speed corresponding to a revolution speed of the mech. oil pump) rises up to a speed value above which the required hydraulic pressure can be ensured, the sub oil pump becomes switched to its stopped state (its inoperative state).

Figure 4:
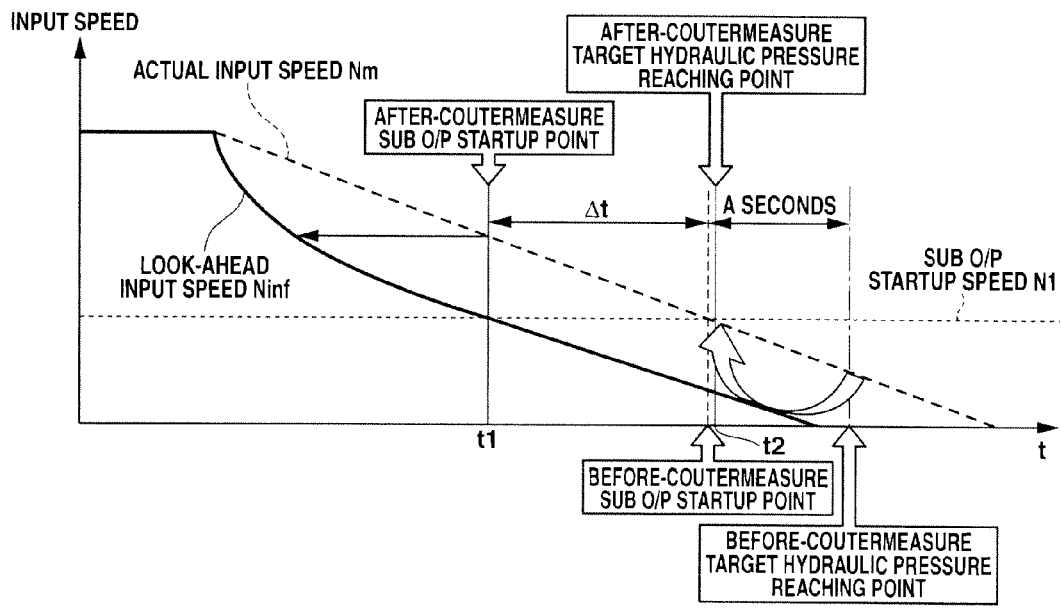
FIG. 4 is a time chart illustrating the relationship between an actual automatic-transmission input speed Nm characteristic and a look-ahead input speed Ninf characteristic during a rapid deceleration condition, used for explaining an inoperative-to-operative switching action for the sub oil pump incorporated in the control system of the first embodiment.

However, when switching the sub oil pump from an inoperative state to an operative state, inverter control (for an inverter of a motor/generator) starts from a point of time when a startup instruction for the sub oil pump has been outputted, and then the pump motor of the sub oil pump begins to rotate so that a target hydraulic pressure is reached. For this reason, as seen in FIG. 4, the pump control system of the comparative example requires a time duration (i.e., "A" seconds) from the point of time (i.e., a before-countermeasure sub-oil-pump startup point indicated by the vertical broken line in FIG. 4) when the startup instruction has been outputted to a point of time (i.e., a before-countermeasure target hydraulic pressure reaching point indicated by the vertical one-dotted line in FIG. 4) when the target hydraulic pressure has been reached.

Hence, in the presence of a rapid transmission input speed fall arising from a rapid deceleration, in the pump control system of the comparative example, an excessive transmission input speed fall tends to occur before a target hydraulic pressure is actually reached from the output of a sub-oil-pump startup instruction, thus resulting in an undesirable supply hydraulic pressure fall.

As a result of this, there is a risk that the normally-closed first clutch CL1 to be held at its disengagement state under hydraulic pressure is undesirably shifted to its engagement state. Also, owing to a lack (or a fall) in supply hydraulic pressure to be supplied to the friction engagement elements of the automatic transmission, there is an increased tendency for an improper shift to occur.

To avoid this, suppose that a level of an input speed threshold value (in other words, a pump startup threshold value) for determining the timing of inoperative-to-operative switching of the sub oil pump is uniformly risen. In such a case, the sub oil pump can be started up at an earlier time. On the one hand, such setting of the input speed threshold value for determining the timing of inoperative-to-operative switching of the sub oil pump contributes to the suppression of a fall in supply hydraulic pressure during a rapid deceleration condition. On the other hand, such setting of the input speed threshold value for determining the timing of inoperative-to-operative switching of the sub oil pump has a demerit that the sub oil pump can be continuously operated wastefully during a steady-state running condition of the vehicle with the automatic transmission operated at low input speeds. This leads to several drawbacks, such as increased fuel consumption rate, increased electric power consumption, and overheating of the pump motor owing to the continuous operation of the sub oil pump.

[Inoperative-to-Operative Switching Control Action of Sub Oil Pump S-O/P]

In the oil pump control apparatus of the first embodiment, look-ahead control action for an input speed (an actual revolution speed of input shaft IN of automatic transmission AT), corresponding to a pump speed of mech. oil pump M-O/P, is performed. In more detail, a decision for inoperative-to-operative switching of sub oil pump S-O/P (simply, a pump startup decision) can be predicted or estimated in advance depending on a vehicle deceleration rate G. Thus, it is possible to prevent a lag in a development (a buildup) of hydraulic pressure produced by sub oil pump S-O/P, while preventing or suppressing sub oil pump S-O/P from being wastefully operated. That is, the oil pump control apparatus of the first embodiment aims at predicting or estimating a future transmission input speed (that is, a look-ahead input speed Ninf), which may occur a given elapsed time (such as "A" seconds+α) later from the current point of time. The inoperative-to-operative switching control action of sub oil pump S-O/P is hereinafter described in detail in reference to FIGS. 2 and 4.

In the case that vehicle deceleration rate G becomes greater than or equal to the third set deceleration rate A3 (set as a rapid-deceleration decision threshold value) in a quick vehicle-stop situation, for instance, when quickly stopping the vehicle with quick braking action, the routine of FIG. 2 flows from step S1 through steps S2-S5 to step S9 (see the flow of S1→S2→S3→S4→S5→S9 in FIG. 2). As soon as only the deceleration condition (G≥A3) has been satisfied regardless of the look-ahead input speed Ninf, the routine advances to step S9 at once, so as to initiate inoperative-to-operative switching of sub oil pump S-O/P responsively to a motor startup instruction for sub oil pump S-O/P.

Therefore, in the case that a rapid fall in actual input speed of automatic transmission AT for a short time period can be clearly predicted, for instance, in a quick vehicle-stop situation with quick braking action, it is possible to suppress a fall in hydraulic pressure at a minimum by outputting a motor startup instruction to sub oil pump S-O/P at once without waiting for a decision for an input speed condition (Ninf≤N1) based on look-ahead input speed Ninf or a decision for an input speed condition (Nm≤N1) based on actual input speed Nm.

In the case that vehicle deceleration rate G becomes less than the first set deceleration rate A1 (set as a look-ahead decision threshold value), such as during a constant-speed running condition or during a moderate deceleration condition, the flow from step S1 through steps S2-S6 to step S8 in the flowchart of FIG. 2 is continually repeated as far as the actual input speed Nm exceeds the first set speed N1 set as an under-developed pump discharge pressure decision threshold value (see the flow of S1→S2→4S3→S4→S5→S6→S8 in FIG. 2), thereby permitting sub oil pump S-O/P to be kept in its inoperative state. Hence, immediately when the actual input speed Nm becomes less than or equal to the first set speed N1, the routine of FIG. 2 proceeds from step S8 to step S9, so as to initiate inoperative-to-operative switching of sub oil pump S-O/P responsively to a motor startup instruction for sub oil pump S-O/P.

Therefore, during a steady-state running condition of the vehicle with the automatic transmission operated at low input speeds, the inoperative state of sub oil pump S-O/P can be maintained until such time that the actual input speed Nm becomes less than or equal to the first set speed N1. Thus, in the case of the oil pump control apparatus of the first embodiment, it is possible to improve fuel economy and reduce electric power consumption as compared to the pump control system of the comparative example, and also to prevent the occurrence of overheating of the pump motor, which may occur owing to the continuous operation of sub oil pump S-O/P.

In the case that vehicle deceleration rate G becomes less than the third set deceleration rate A3 (set as a rapid-deceleration decision threshold value) but greater than or equal to the first set deceleration rate A1 (set as a look-ahead decision threshold value), for instance, during a rapid deceleration condition that the vehicle is stopping, while depressing a brake pedal after the accelerator pedal has been released, the flow from step S1 through steps S2-S6 to step S7 in the flowchart of FIG. 2 is continually repeated as far as the look-ahead input speed Ninf exceeds the first set speed N1 set as an under-developed pump discharge pressure decision threshold value (see the flow of S1→S2→S3→S4→S5→S6→S7 in FIG. 2). Hence, immediately when the look-ahead input speed Ninf becomes less than or equal to the first set speed N1, the routine of FIG. 2 proceeds from step S7 to step S9, so as to initiate inoperative-to-operative switching of sub oil pump S-O/P responsively to a motor startup instruction for sub oil pump S-O/P.

Therefore, during a rapid deceleration condition that a gradient of an input speed fall is great, sub oil pump S-O/P can be operated according to a decision for an input speed condition (Ninf≤N1) based on look-ahead input speed Ninf. Thus, a motor startup instruction can be outputted at an earlier time (i.e., at the time t1 in FIG. 4) before the actual input speed Nm reaches a sub-oil-pump startup speed (=first set speed N1). For the reasons discussed above, in the case of the pump control system of the first embodiment, there is a margin in time (a sufficient time duration) Δt between the time t1 when a motor startup instruction has been outputted based on a decision for an input speed condition (Ninf≤N1) based on look-ahead input speed Ninf and the time (the point of time indicated by the vertical broken line in FIG. 4 immediately before the time t2) when the actual input speed Nm reaches the sub-oil-pump startup speed (=first set speed N1). Thus, it is possible to accomplish a hydraulic pressure buildup produced by the startup of the pump motor as well as inverter control action for the sufficient time duration (the margin) Δt. After this, a target hydraulic pressure is achieved at the time t2 (i.e., an after-countermeasure target hydraulic pressure reaching point) substantially corresponding to the time (the point of time indicated by the vertical broken line in FIG. 4) when the margin (the sufficient time duration) Δt has been elapsed from the time t1 (i.e., an after-countermeasure sub-oil-pump startup point). In this manner, the after-countermeasure target hydraulic pressure reaching point (i.e., the time t2 when a target hydraulic pressure has been reached) almost accords with the time (i.e., t1+Δt) when the actual input speed Nm reaches the sub-oil-pump startup speed (=first input speed N1), thereby preventing an undesirable hydraulic pressure fall, which may occur by the pump control of the comparative example, on a rapid deceleration condition with a vehicle deceleration rate G less than the third set deceleration rate A3 but greater than or equal to the first set deceleration rate A1 (i.e., A1≤G<A3).

Thus, according to the oil pump control apparatus of the first embodiment, there is a less risk that the normally-closed first clutch CL1 to be held at its disengagement state under hydraulic pressure is undesirably shifted to its engagement state. Additionally, there is a less tendency for an improper shift to occur owing to a lack (or a fall) in supply hydraulic pressure to be supplied to the friction engagement elements of automatic transmission AT.

[Operative-to-Inoperative Switching Control Action of Sub Oil Pump S-O/P]

As previously discussed, in the sub-oil-pump inoperative-to-operative switching control action, executed by the oil pump control apparatus of the first embodiment, a pump startup decision is made, utilizing look-ahead input speed Ninf, depending on a vehicle deceleration rate G. Hence, also in the sub-oil-pump operative-to-inoperative switching control action, executed by the oil pump control apparatus of the first embodiment, a pump stop decision (G<A2) for sub-oil-pump operative-to-inoperative switching based on vehicle deceleration rate G is added to a pump stop decision (Nm>N2) for sub-oil-pump operative-to-inoperative switching based on actual input speed Nm. The operative-to-inoperative switching control action of sub oil pump S-O/P is hereinafter described in detail in reference to FIG. 3.

In the case that vehicle deceleration rate G becomes less than the second set deceleration rate A2 (set as a non-deceleration condition decision threshold value), for instance, when the brakes are released or the accelerator pedal is depressed under an operative state of sub oil pump S-O/P that the specific situation defined by Nm≤Ni remains unexperienced after inoperative-to-operative switching of sub oil pump S-O/P has occurred responsively to a decision result based on look-ahead input speed Ninf and defined by Ninf≤N1 (see step S7 of FIG. 2), the flow from step S11 through steps S12-S14 to step S15 in the flowchart of FIG. 3 is continually repeated. Immediately when the timer value Ttimer reaches a set timer value T1, while the specific situation defined by Nm≤Ni remains unexperienced and the condition defined by G<A2 remains satisfied, the routine of FIG. 3 proceeds from step S15 to step S17, so as to initiate operative-to-inoperative switching of sub oil pump S-O/P responsively to a motor stop instruction for sub oil pump S-O/P.

Therefore, in the case that a vehicle condition has been shifted to a constant-speed running condition, while suppressing the vehicle deceleration rate, immediately after sub oil pump S-O/P has started up responsively to a decision result based on look-ahead input speed Ninf and defined by Ninf≤N1 (see step S7 of FIG. 2) during a rapid deceleration condition, the oil pump control apparatus of the first embodiment operates to stop sub oil pump S-O/P at once, as soon as a continuous constant-speed running condition is confirmed. Thus, it is possible to avoid the operative state of sub oil pump S-O/P from being wastefully maintained, and also to prevent overheating of the pump motor owing to the continuous operation of sub oil pump S-O/P. That is, it is possible to eliminate a bad effect caused by starting up the sub oil pump at an earlier time responsively to a decision result (Ninf≤N1) based on look-ahead input speed Ninf.

In the case that the vehicle is stopped once under an operative state of sub oil pump S-O/P and then the vehicle is restarted and thus the actual input speed Nm is increasing due to a vehicle speed rise, the routine of FIG. 3 flows from step S11 through steps S12-S13 to step S16 (see the flow of S11→S12→S13→S16 in FIG. 3) and thereafter a decision of step S16 is repeatedly executed, while maintaining the operative state of sub oil pump S-O/P until such time that the actual input speed (=motor speed Nm) exceeds the second set speed N2 (set as a pump stop decision threshold value). Hence, immediately when the actual input speed Nm exceeds the second set speed N2 (>the first set speed N1), the routine of FIG. 3 proceeds from step S16 to step S17, so as to initiate operative-to-inoperative switching of sub oil pump S-O/P responsively to a motor stop instruction for sub oil pump S-O/P.

Therefore, immediately when the actual input speed Nm exceeds the second set speed N2 that a required magnitude of discharge pressure from mech. oil pump M-O/P can be ensured, sub oil pump S-O/P can be quickly stopped. Thus, it is possible to avoid the operative state of sub oil pump S-O/P from being wastefully maintained, thereby ensuring improved fuel economy and reduced electric power consumption, and also preventing the pump motor from overheating due to the continuous operation of sub oil pump S-O/P.

The oil pump control apparatus of the first embodiment, which is applied to a FR hybrid vehicle, can provide the following effects.

(1) The oil pump control apparatus of the first embodiment includes a first driving power source (engine ENG, motor/generator MG) for propelling the vehicle, a first oil pump (mech. oil pump M-O/P) driven by the first driving power source (engine ENG, motor/generator MG), a second oil pump (sub oil pump S-O/P) driven by a second driving power source (motor 23), a hydraulically-operated portion (automatic transmission AT, etc.) that is supplied with working oil from the first and second oil pumps, a look-ahead vehicle speed estimation section (look-ahead vehicle speed estimation means, i.e., steps S1 to S4 in FIG. 2) for estimating, based on a running condition of the vehicle, a look-ahead vehicle speed (VSPinf), which may occur a given elapsed time later, and a second-oil-pump control section (second-oil-pump control means, i.e., steps S5 to S9 in FIG. 2) configured to predict, based on the look-ahead vehicle speed (VSPinf), whether a lack in discharge pressure produced by the first oil pump (mech. oil pump M-O/P) driven by the first driving power source (engine ENG, motor/generator MG) from a required hydraulic pressure needed for the hydraulically-operated portion (automatic transmission AT, etc.) occurs, and further configured to start up the second oil pump (sub oil pump S-O/P), when it is predicted that a lack in discharge pressure of the first oil pump (mech. oil pump M-O/P) from the required hydraulic pressure occurs.

Therefore, it is possible to prevent the second oil pump (sub oil pump S-O/P) from being wastefully driven even during a moderate deceleration condition, and further to prevent a lack in hydraulic pressure to be supplied to the hydraulically-operated portion (automatic transmission AT, etc.) even during a rapid deceleration condition.

(2) A look-ahead revolution speed calculation section (look-ahead revolution speed calculation means, i.e., steps S1 to S4 in FIG. 2) is further provided and configured to arithmetically calculate and estimate, based on the look-ahead vehicle speed (VSPinf), a look-ahead revolution speed of a rotating member (input shaft IN) having a driving-connection with the mechanical oil pump (mech. oil pump M-O/P), which look-ahead revolution speed may occur the given elapsed time later. The hydraulically-operated portion comprises a friction engagement element, which element is provided on a power-transmission path between the first driving power source (engine ENG, motor/generator MG) and drive road wheels (rear-left and rear-right road wheels RL, RR), and whose engagement-disengagement states can be switched by working oil from at least one of the first and second oil pumps (mech. oil pump M-O/P and/or sub oil pump S-O/P), the first oil pump comprises a mechanical oil pump (mech. oil pump M-O/P), which is laid out to be offset toward the first driving power source (engine ENG, motor/generator MG) on the power-transmission path from the friction engagement element, and driven by the rotating member (input shaft IN) provided on the power-transmission path, and configured to supply working oil to the friction engagement element, the second oil pump comprises an electric-motor-driven oil pump (sub oil pump S-O/P), the second driving power source comprises an electric motor (motor 23) for driving the electric-motor-driven oil pump (sub oil pump S-O/P), the second-oil-pump control section (second-oil-pump control means) comprises an electric-motor-driven oil pump control section (electric-motor-driven oil pump control means) for controlling switching between operative and inoperative states of the electric-motor-driven oil pump (sub oil pump S-O/P), and the second-oil-pump control section (second-oil-pump control means, i.e., steps S5 to S9 in FIG. 2) configured to make a startup decision for inoperative-to-operative switching of the electric-motor-driven oil pump (sub oil pump S-O/P), based on the look-ahead revolution speed, and further configured to initiate the inoperative-to-operative switching of the electric-motor-driven oil pump, when a result of the startup decision is affirmative (YES).

Therefore, in the vehicle on which the mechanical oil pump (mech. oil pump M-O/P) and the electric-motor-driven oil pump (sub oil pump S-O/P) are both mounted, it is possible to prevent the electric-motor-driven oil pump (sub oil pump S-O/P) from being wastefully driven even during a moderate deceleration condition, and further to prevent a lack in hydraulic pressure to be supplied to the friction engagement element, serving as the hydraulically-operated portion that is supplied with working oil, even during a rapid deceleration condition.

(3) The friction engagement element comprises a clutch (second clutch CL2) installed in the automatic transmission AT, the rotating member comprises an input shaft IN of the automatic transmission AT, the look-ahead revolution speed calculation section (look-ahead revolution speed calculation means, i.e., steps S1 to S4 in FIG. 2) comprises an arithmetic-calculation section (look-ahead input speed calculation means) for arithmetically calculating and estimating, based on an actual revolution speed of the input shaft IN and a vehicle deceleration rate G, a look-ahead input speed Ninf of the input shaft IN, which look-ahead input speed may occur the given elapsed time later, and the electric-motor-driven oil pump control section (electric-motor-driven oil pump control means, see the flow from step S7 to step S9 in FIG. 2) is configured to switch the electric-motor-driven oil pump (sub oil pump S-O/P) to the operative state, when, under the inoperative state of the electric-motor-driven oil pump (sub oil pump S-O/P), the look-ahead input speed (Ninf) becomes less than or equal to a first set speed N1, set as an under-developed pump discharge pressure decision threshold value.

Therefore, in the vehicle (a FR hybrid vehicle) having a drive drain that the mechanical oil pump (mech. oil pump m-O/P) is installed on the input shaft IN of the automatic transmission AT, by virtue of the look-ahead processing of input-speed information based on the actual revolution speed of the input shaft IN of the automatic transmission AT and the vehicle deceleration rate G, it is possible to prevent the electric-motor-driven oil pump (sub oil pump S-O/P) from being wastefully driven even during a moderate deceleration condition, and further to prevent a lack in hydraulic pressure to be supplied to the friction engagement element even during a rapid deceleration condition.

(4) The electric-motor-driven oil pump control section (electric-motor-driven oil pump control means, see the inoperative-to-operative switching control routine of FIG. 2) is configured to switch the electric-motor-driven oil pump (sub oil pump S-O/P) to the operative state, when, under a condition where the vehicle deceleration rate G is greater than or equal to a first set deceleration rate A1, set as a look-ahead decision threshold value, the look-ahead input speed Ninf becomes less than or equal to the first set speed N1, set as the under-developed pump discharge pressure decision threshold value (see the flow from step S6 through step S7 to step S9 in FIG. 2), and further configured to switch the electric-motor-driven oil pump (sub oil pump S-O/P) to the operative state, when, under a condition where the vehicle deceleration rate G is less than the first set deceleration rate A1, set as the look-ahead decision threshold value, the actual revolution speed of the input shaft IN of the automatic transmission AT becomes less than or equal to the first set speed N1, set as the under-developed pump discharge pressure decision threshold value (see the flow from step S6 through step S8 to step S9 in FIG. 2).

Therefore, by splitting the decision processing based on the vehicle deceleration rate G into a first decision process based on look-ahead input speed Ninf and a second decision process based on the actual revolution speed of the input shaft IN of the automatic transmission AT, while monitoring a deceleration condition of the vehicle, it is possible to reconcile (i) prevention of a lack in hydraulic pressure to be supplied to the friction engagement element during a rapid deceleration condition, and (ii) prevention of a wasteful startup of the electric-motor-driven oil pump (sub oil pump S-O/P) during a constant-speed running condition or during a moderate deceleration condition.

(5) The electric-motor-driven oil pump control section (electric-motor-driven oil pump control means, see the operative-to-inoperative switching control routine of FIG. 3) is configured to switch the electric-motor-driven oil pump (sub oil pump S-O/P) to the inoperative state, when, under the operative state of the electric-motor-driven oil pump (sub oil pump S-O/P), a specific situation (Nm≦Ni) where the actual revolution speed of the input shaft IN of the automatic transmission AT becomes less than or equal to the first set speed N1, set as the under-developed pump discharge pressure decision threshold value, remains unexperienced after the inoperative-to-operative switching of the electric-motor-driven oil pump (sub oil pump S-O/P) has occurred, and when the vehicle deceleration rate G becomes less than a second set deceleration rate A2, set as a non-deceleration condition decision threshold value (see the flow from step S13 through steps S14-S15 to step S17 in FIG. 3).

Therefore, in the case that a vehicle condition has been shifted to a constant-speed running condition, while suppressing the vehicle deceleration rate, immediately after the electric-motor-driven oil pump (sub oil pump S-O/P) has started up responsively to a decision result (Ninf≦N1) based on the look-ahead input speed Ninf during a rapid deceleration condition, the electric-motor-driven oil pump (sub oil pump S-O/P) can be stopped at once as soon as a continuous constant-speed running condition is confirmed. Thus, it is possible to avoid the operative state of the electric-motor-driven oil pump (sub oil pump S-O/P) from being wastefully maintained, and also to prevent overheating of the pump motor owing to the continuous operation of the electric-motor-driven oil pump (sub oil pump S-O/P).

(6) The electric-motor-driven oil pump control section (electric-motor-driven oil pump control means, see the operative-to-inoperative switching control routine of FIG. 3) is configured to switch the electric-motor-driven oil pump (sub oil pump S-O/P) to the inoperative state regardless of the vehicle deceleration rate G, when, under the operative state of the electric-motor-driven oil pump (sub oil pump S-O/P), a specific situation (Nm≦Ni) where the actual revolution speed of the input shaft IN of the automatic transmission AT becomes less than or equal to the first set speed N1, set as the under-developed pump discharge pressure decision threshold value, has been experienced after the inoperative-to-operative switching of the electric-motor-driven oil pump (sub oil pump S-O/P) has occurred, and when the actual revolution speed of the input shaft IN of the automatic transmission AT exceeds a second set speed N2, set as a pump stop decision threshold value (see the flow from step S13 through step S16 to step S17 in FIG. 3).

Therefore, immediately when the actual revolution speed of the input shaft IN of the automatic transmission AT exceeds the second set speed N2 that a required magnitude of discharge pressure from the mechanical oil pump (mech. oil pump M-O/P) can be ensured, the electric-motor-driven oil pump (sub oil pump S-O/P) can be quickly stopped. Thus, it is possible to prevent an energy efficiency from being deteriorated and also to prevent overheating of the pump motor.

(7) The electric-motor-driven oil pump control section (electric-motor-driven oil pump control means, see the inoperative-to-operative switching control routine of FIG. 2) is configured to switch the electric-motor-driven oil pump (sub oil pump S-O/P) to the operative state regardless of the look-ahead input speed Ninf, when, under the inoperative state of the electric-motor-driven oil pump (sub oil pump S-O/P), the vehicle deceleration rate G becomes greater than or equal to a third set deceleration rate A3, set as a rapid-deceleration decision threshold value (see the flow from step S5 to step S9 in FIG. 2).

Therefore, in the case that a rapid fall in the actual revolution speed of the input shaft IN of the automatic transmission AT for a short time period can be clearly predicted, for instance, in a quick vehicle-stop situation with quick braking action, it is possible to suppress a fall in hydraulic pressure at a minimum by outputting a motor startup instruction to the electric-motor-driven oil pump (sub oil pump S-O/P) at once without waiting for a decision for a revolution speed condition (Ninf≤N1) based on the look-ahead input speed Ninf or a decision for a revolution speed condition (Nm≤N1) based on the actual revolution speed of the input shaft IN.

Second Embodiment

Figure 5:
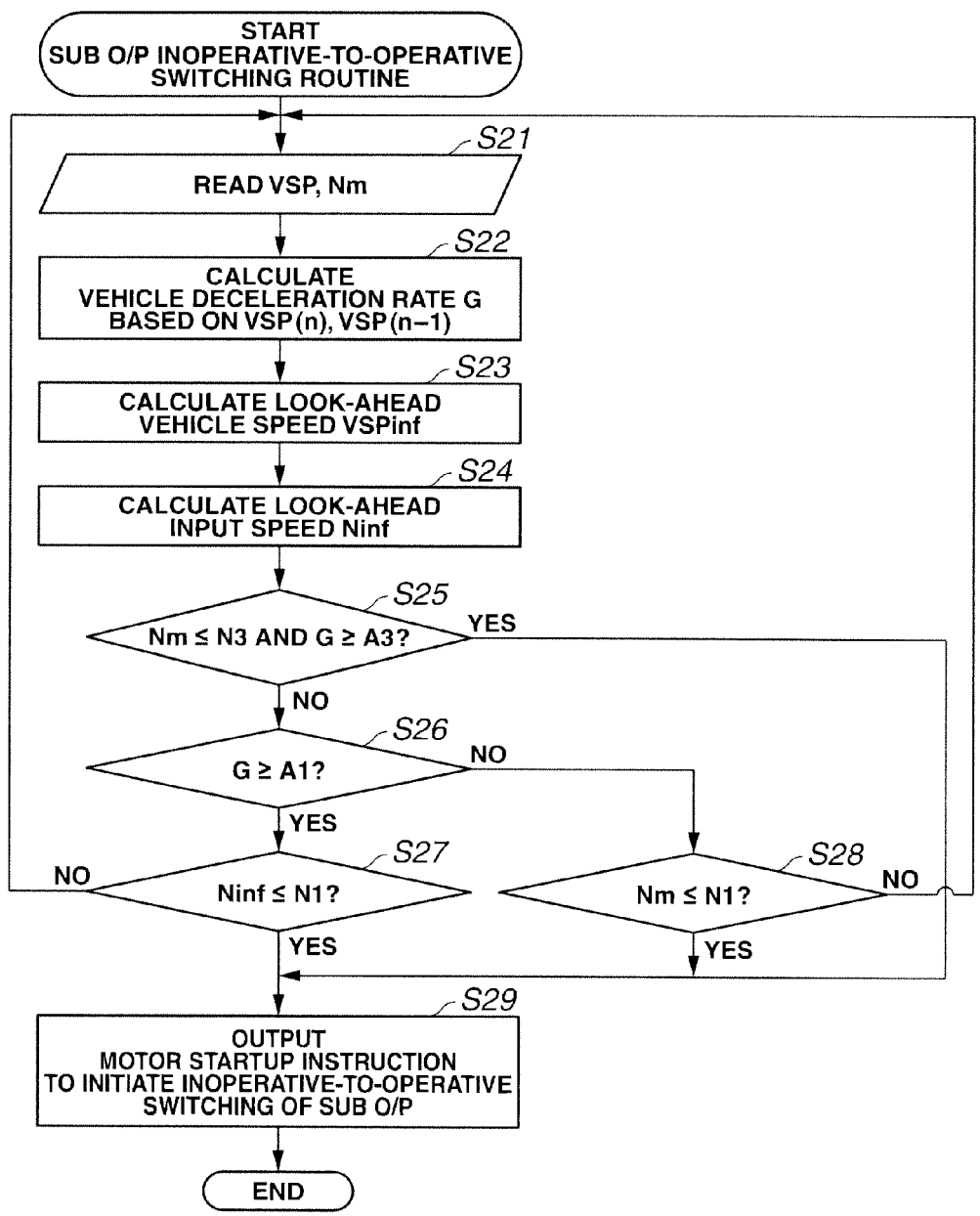
FIG. 5 is a flowchart illustrating a sub-oil-pump inoperative-to-operative switching routine of oil pump control processing executed within the AT controller incorporated in the control system of the second embodiment.
Figure 6:
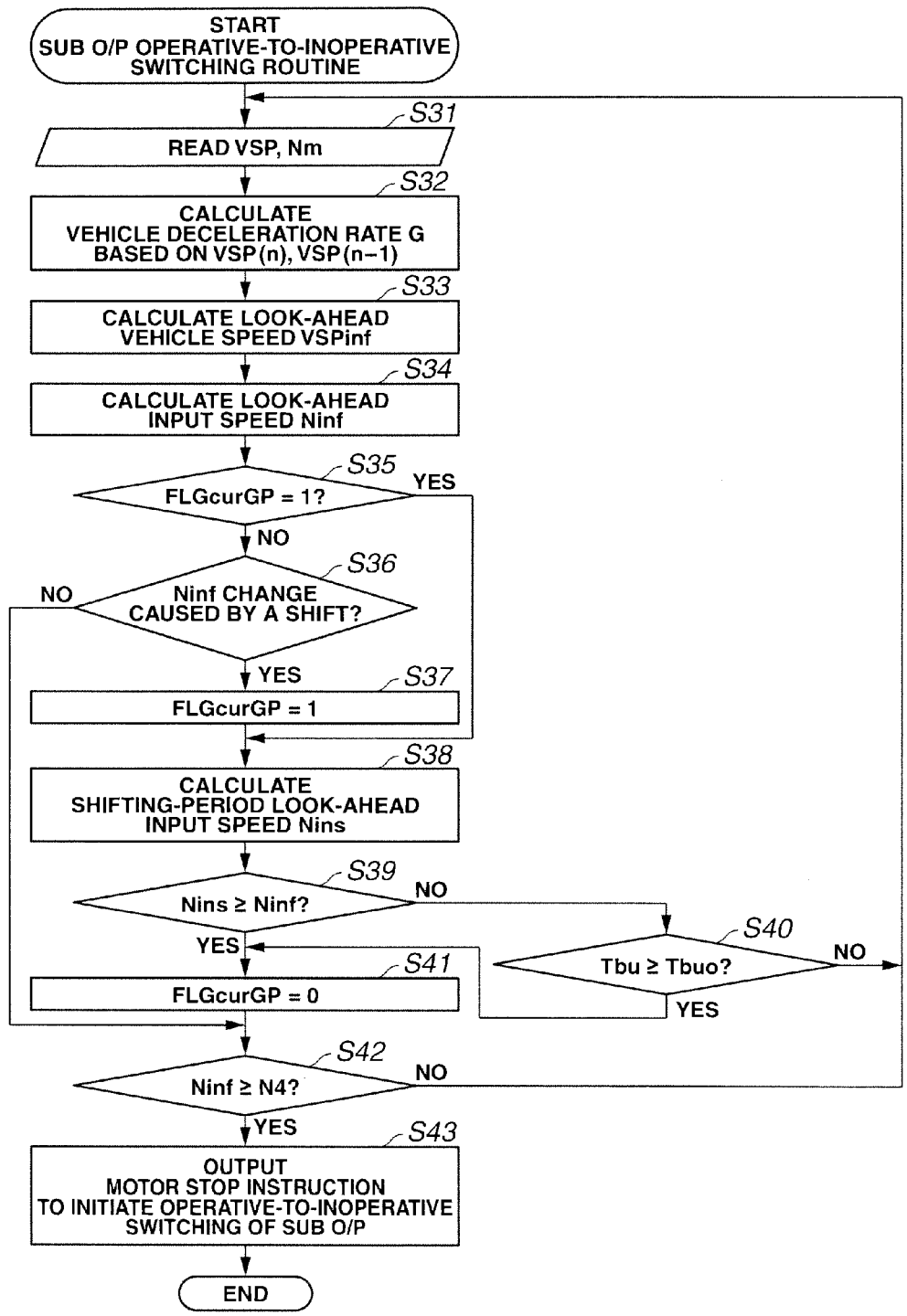
FIG. 6 is a flowchart illustrating a sub-oil-pump operative-to-inoperative switching routine of oil pump control processing executed within the AT controller incorporated in the control system of the second embodiment.

Referring now to FIGS. 5-6, there are shown modified oil pump control routines executed by the processor of AT controller 7 incorporated in the control system of the second embodiment. Each of the modified oil pump control routine (the sub-oil-pump inoperative-to-operative switching routine corresponding to look-ahead vehicle speed estimation means and second oil pump control means) of FIG. 5 and the modified oil pump control routine (the sub-oil-pump operative-to-inoperative switching routine) of FIG. 6 is also executed as time-triggered interrupt routines to be triggered every predetermined time intervals. First, the modified sub-oil-pump inoperative-to-operative switching routine is hereunder described in reference to the flowchart of FIG. 5. The modified sub-oil-pump inoperative-to-operative switching routine of FIG. 5 is similar to the arithmetic and logic processing of FIG. 2, except that step S5 included in the routine shown in FIG. 2 is replaced with step S25 included in the routine shown in FIG. 5. As appreciated from comparison of the two different interrupt routines of FIGS. 2 and 5, steps S21-S24 and S26-S29 of the flowchart of FIG. 5 correspond to respective steps S1-S4 and S6-S9 of the flowchart of FIG. 2. Step S25 will be hereinafter described in detail with reference to the accompanying drawings, while detailed description of steps S21-S24 and S26-S29 (corresponding to steps S1-S4 and S6-S9) will be omitted because the above description thereon seems to be self-explanatory.

Subsequently to the arithmetic calculation of look-ahead input speed Ninf, executed through step S24, step S25 occurs.

At step S25, a check is made to determine whether an actual input speed (=motor speed Nm) corresponding to an actual revolution speed of input shaft IN of automatic transmission AT is less than or equal to a third set speed N3 (set as a rapid deceleration period sub-oil-pump startup permission decision threshold value) and the vehicle deceleration rate G, calculated through step S22, is greater than or equal to a third set deceleration rate A3 (set as a rapid-deceleration decision threshold value). When the answer to step S25 is in the affirmative (YES), that is, when Nn≤N3 and G≥A3, the routine proceeds to step S29. Conversely when the answer to step S25 is in the negative (NO), that is, when Nm>N3 or G<A3, the routine proceeds to step S26.

Referring now to FIG. 6, there is shown the flowchart illustrating the modified sub-oil-pump operative-to-inoperative switching routine (corresponding to the second oil pump control means) of oil pump control processing executed by the processor of AT controller 7 incorporated in the control system of the second embodiment. Details of respective steps S31-S43 of the modified sub-oil-pump operative-to-inoperative switching routine are hereunder described in reference to the flowchart of FIG. 6.

At step S31, vehicle speed VSP from vehicle speed sensor 17 and motor speed Nm from motor speed sensor 21 are read. Thereafter, step S32 occurs.

At step S32, an infinite difference between a vehicle speed VSP(n) read at the current execution cycle and a vehicle speed VSP(n−1) read at the previous execution cycle (before one execution cycle) is arithmetically calculated by a differential operation, to obtain a vehicle deceleration rate G, and then step S33 occurs.

At step S33, a look-ahead vehicle speed VSPinf after a predetermined time has elapsed is estimated and computed based on the current vehicle speed VSP(n) and the calculated vehicle deceleration rate G, and then step S34 occurs. In the shown embodiment, the previously-noted predetermined time is set to a hydraulic pressure buildup equivalent time duration from a point of time when a motor startup instruction for sub oil pump S-O/P has been outputted to a point of time when the discharge pressure of sub oil pump S-O/P reaches a target hydraulic pressure.

At step S34, a look-ahead input speed Ninf of input shaft IN of automatic transmission AT is arithmetically calculated based on the calculated look-ahead vehicle speed VSPinf and a current transmission ratio CurGP of automatic transmission AT, from the following expression. In arithmetically calculating the look-ahead input speed Ninf, as the information regarding a transmission gear ratio, the current transmission ratio CurGP is used without using a shift command transmission gear ratio NextGP or a control transmission gear ratio SftGP. Hence, in the case of the use of the current transmission ratio CurGP, the look-ahead input speed Ninf tends to become a lower transmission input speed, as compared to the use of shift command transmission gear ratio NextGP or control transmission gear ratio SftGP.

$$Ninf = VSPinf \times CurGP$$

At step S35, subsequently to the look-ahead input speed Ninf arithmetic calculation of step S34, a check is made to determine whether a shifting flag FLGcurGP is set (i.e., FLGcurGP=1. When the answer to step S35 is in the affirmative (YES), that is, when FLGcurGP=1, the routine jumps to step S38. Conversely when the answer to step S35 is in the negative (NO), that is, when FLGcurGP=0, the routine proceeds to step S36.

At step S36, executed under a decision result defined by FLGcurGP=0 at step S35, a check is made to determine whether there is a change in look-ahead input speed Ninf, caused by a change in the current transmission ratio CurGP (i.e., a shift of automatic transmission AT). When the answer to step S35 is in the affirmative (YES), that is, when there is a change in look-ahead input speed Ninf, caused by a change in the current transmission ratio CurGP, the routine proceeds to step S37. Conversely when the answer to step S35 is in the negative (NO), that is, when there is no change in look-ahead input speed Ninf, caused by a change in the current transmission ratio CurGP, the routine proceeds to step S42. In determining the presence or absence of a change in look-ahead input speed Ninf, caused by a change in the current transmission ratio CurGP, in the second embodiment, a result of comparison between look-ahead input speed Ninf and a fourth set speed N4 (set as a pump stop decision threshold value needed to determine whether sub oil pump S-O/P should be stopped) is used. For instance, when, due to a change in the current transmission ratio CurGP from a second-speed gear position to a first-speed gear position, that is, due to a 2→1 downshift, an increase in look-ahead input speed Ninf occurs, the increased look-ahead input speed Ninf is compared to the fourth set speed N4 (set as a pump stop decision threshold value, in other words, a sub-oil-pump stop speed). When the increased look-ahead input speed Ninf becomes greater than or equal to the fourth set speed N4, that is, when Ninf≥N4, it is determined that there is a change in look-ahead input speed Ninf, caused by a change in the current transmission ratio CurGP and thus the routine proceeds from step S36 to step S37. Conversely when the increased look-ahead input speed Ninf becomes less than the fourth set speed N4, that is, when Ninf<N4, it is determined that there is no change in look-ahead input speed Ninf, caused by a change in the current transmission ratio CurGP, and thus the routine proceeds from step S36 to step S42.

At step S37, responsively to a decision result of the presence of a change in look-ahead input speed Ninf, caused by a shift at step S36, the shifting flag FLGcurGP is rewritten from a reset state of FLGcurGP=0 to a set state of FLGcurGP=1. Thereafter, step S38 occurs.

At step S38, responsively to a decision result defined by FLGcurGP=1 at step S35, or subsequently to the rewriting action of the shifting flag FLGcurGP to a set state (FLGcurGP=1) at step S37, a shifting-period look-ahead input speed Nins, needed for a pump stop decision, is calculated based on a speed value of look-ahead input speed Ninf, calculated at the shift start point at which a shift (e.g., a 2→1 downshift) starts. In the second embodiment, a shifting-period look-ahead input speed Nins characteristic is set, such that shifting-period look-ahead input speed Nins is held at a constant speed value equal to the look-ahead input speed Ninf calculated at the shift start point, or such that shifting-period look-ahead input speed Nins is increased at a given ramp gradient from a speed value equal to the look-ahead input speed Ninf calculated at the shift start point. Thereafter, step S39 occurs.

At step S39, a check is made to determine whether the shifting-period look-ahead input speed Nins characteristic has crossed the look-ahead input speed Ninf characteristic and thereafter the shifting-period look-ahead input speed Nins becomes greater than or equal to the look-ahead input speed Ninf. When the answer to step S39 is in the affirmative (YES), that is, when Nins≥Ninf, the routine proceeds to step S41. Conversely when the answer to step S39 is in the negative (NO), that is, when Nins<Ninf, the routine proceeds to step S40.

At step S40, executed under a decision result defined by Nins<Ninf at step S39, a check is made to determine whether a backup timer value Tbu of a backup timer, which timer becomes started up from a point of time when the condition (the decision result) defined by Nins<Ninf at step S39 becomes satisfied, is greater than or equal to a set timer value Tbuo. When the answer to step S40 is in the affirmative (YES), that is, when Tbu≥Tbuo, the routine proceeds to step S41. Conversely when the answer to step S40 is in the negative (NO), that is, when Tbu<Tbuo, the routine returns to step S31.

At step S41, responsively to a decision result defined by Nins≥Ninf at step S39, or a decision result defined by Tbu≥Tbuo at step S40, the shifting flag FLGcurGP is rewritten from a set state of FLGcurGP=1 to a reset state of FLGcurGP=0. Thereafter, step S42 occurs.

Figure 7:
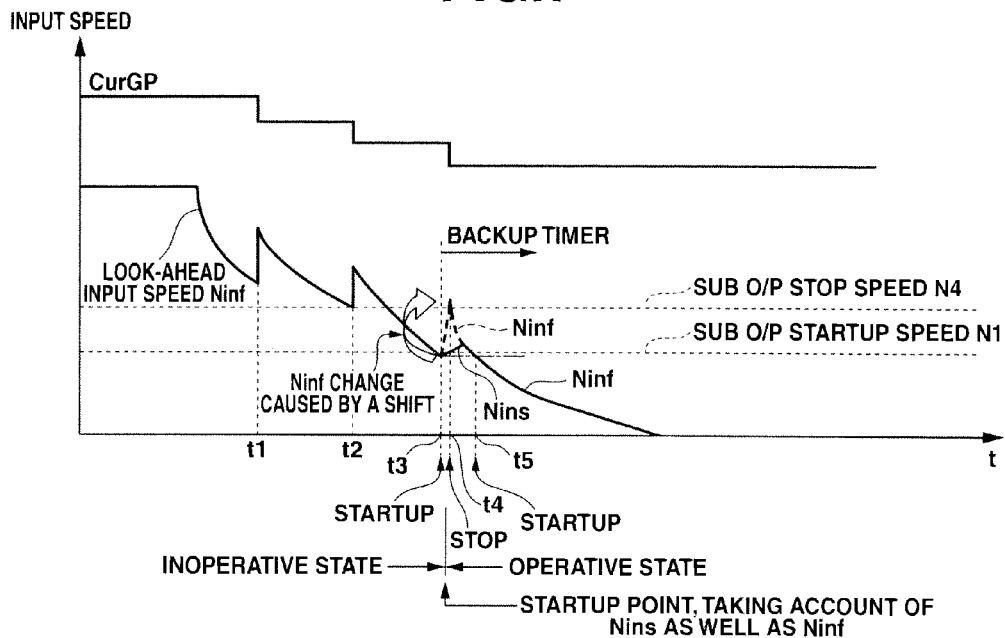
FIG. 7 is a time chart illustrating the relationship among a current transmission gear ratio CurGP, a look-ahead input speed Ninf characteristic, and a shifting-period look-ahead input speed Nins characteristic during a rapid deceleration condition, used for explaining switching actions between inoperative and operative states for the sub oil pump incorporated in the control system of the second embodiment.

At step S42, responsively to a decision result of the absence of a change in look-ahead input speed Ninf caused by a shift at step S36, or subsequently to the rewriting action of the shifting flag FLGcurGP to a reset state (FLGcurGP=0) at step S37, a check is made to determine whether look-ahead input speed Ninf is greater than or equal to the fourth set speed N4 (set as a pump stop decision threshold value). When the answer to step S42 is in the affirmative (YES), that is, when Ninf≥N4, the routine proceeds from step S42 to step S43. Conversely when the answer to step S42 is in the negative (NO), that is, when Ninf<N4, the routine returns from step S42 to step S31. That is, step S42 serves as a pump stop decision section (pump stop decision means). In the second embodiment, the fourth set speed N4 (set as a pump stop decision threshold value, in other words, a sub-oil-pump stop speed), needed for a pump stop decision, is set to a speed value somewhat higher than the first set speed N1 (set as an under-developed pump discharge pressure decision threshold value, in other words, a sub-oil-pump startup speed), that is, N4>N1 (see the difference between the two horizontal broken lines in FIG. 7).

At step S43, responsively to a decision result defined by Ninf≥N4 at step S42, a motor stop instruction for sub oil pump S-O/P is outputted and thus operative-to-inoperative switching of sub oil pump S-O/P occurs. In this manner, one execution cycle of the sub-oil-pump operative-to-inoperative switching routine of FIG. 6 ends.

The system configuration of the second embodiment is similar to that of the first embodiment (see FIG. 1), and thus detailed explanation of the system configuration of the second embodiment will be omitted because the above description thereon seems to be self-explanatory.

Details of the operation (in particular, sub-oil-pump inoperative-to-operative switching control action and sub-oil-pump operative-to-inoperative switching control action) of the oil pump control apparatus of the second embodiment, which is applied to the FR hybrid vehicle, are hereunder described in detail.

[Inoperative-to-Operative Switching Control Action of Sub Oil Pump S-O/P]

In the case that the actual input speed of input shaft IN of automatic transmission AT becomes less than or equal to the third set speed N3 (set as a rapid deceleration period sub-oil-pump startup permission decision threshold value) and vehicle deceleration rate G becomes greater than or equal to the third set deceleration rate A3 (set as a rapid-deceleration decision threshold value) in a vehicle-stop situation, for instance, when stopping the vehicle with quick braking action from the vehicle decelerating condition, the routine of FIG. 5 flows from step S21 through steps S22-S25 to step S29 (see the flow of S21→S22→S23→S24→S25→S29 in FIG. 5). As soon as the actual input speed condition (Nm≤N3) and the deceleration condition (G≥A3) have been satisfied regardless of the look-ahead input speed Ninf, the routine advances to step S29 at once, so as to initiate inoperative-to-operative switching of sub oil pump S-O/P responsively to a motor startup instruction for sub oil pump S-O/P.

Therefore, in the case that a remarkable fall in actual input speed of automatic transmission AT down to a sub-oil-pump startup speed (or a pump startup decision threshold value) can be clearly predicted, for instance, when stopping the vehicle with quick braking action from the vehicle decelerating condition, it is possible to suppress a fall in hydraulic pressure at a minimum by outputting a motor startup instruction to sub oil pump S-O/P at once without waiting for a decision for an input speed condition (Ninf≤N1) based on look-ahead input speed Ninf, as soon as the actual input speed condition (Nm≤N3) and the deceleration condition (G≥A3) are both satisfied.

[Operative-to-Inoperative Switching Control Action of Sub Oil Pump S-O/P]

The oil pump control apparatus of the second embodiment is configured to perform a pump startup decision for inoperative-to-operative switching of sub oil pump S-O/P, based on look-ahead input speed Ninf, and also configured to perform a pump stop decision for operative-to-inoperative switching of sub oil pump S-O/P, based on the same look-ahead input speed Ninf, in combination with the Ninf dependent pump startup decision. The operative-to-inoperative switching control action of sub oil pump S-O/P is hereinafter described in detail in reference to FIG. 7. In estimating and computing look-ahead input speed Ninf of input shaft IN, which may occur a given elapsed time later, the look-ahead input speed Ninf can be actually obtained by converting look-ahead vehicle speed VSPinf (=a look-ahead output speed of automatic transmission AT, predicted in advance) into an input speed of automatic transmission AT by a current transmission ratio CurGP of automatic transmission AT. In such a case, as seen from the look-ahead input speed Ninf characteristic at the points of time t1, t2, or t3 in FIG. 7, look-ahead input speed Ninf tends to change in a stepwise manner in accordance with a change in the current transmission ratio CurGP (for example, a 4→3 downshift, a 3→2 downshift, and a 2→1 downshift).

Thus, suppose that look-ahead input speed Ninf, changing in a stepwise manner due to shifting, is just used for pump control. As seen from the look-ahead input speed Ninf characteristic of the time chart of FIG. 7, inoperative-to-operative switching of sub oil pump S-O/P occurs at the time t3 when look-ahead input speed Ninf becomes less than or equal to the first set speed N1 (an under-developed pump discharge pressure decision threshold value, that is, a sub-oil-pump startup speed, in other words, a pump startup decision threshold value). Thereafter, operative-to-inoperative switching of sub oil pump S-O/P occurs at the time t4 when look-ahead input speed Ninf becomes greater than or equal to the fourth set speed N4 (a pump stop decision threshold value, in other words, a sub-oil-pump stop speed) due to a change in the current transmission ratio CurGP (e.g., a 2→1 downshift). After this, inoperative-to-operative switching of sub oil pump S-O/P occurs again at the time t5 when look-ahead input speed Ninf becomes less than or equal to the first set speed N1. That is to say, assuming that look-ahead input speed Ninf, changing in a stepwise manner due to shifting, is just used for pump control, there is an increased tendency for undesirable hunting phenomenon for pump control (i.e., repeated switching actions between operative and inoperative states of sub oil pump S-O/P) to occur.

To avoid this, that is, to avoid repeated switching actions between operative and inoperative states of sub oil pump S-O/P, which may occur by the use of look-ahead input speed Ninf, changing in a stepwise manner due to a change in the current transmission ratio CurGP, a width of hysteresis between the first set speed N1 (a pump startup decision threshold value) and the fourth set speed N4 (a pump stop decision threshold value) may be enlarged. However, enlarging the width of hysteresis between the first and fourth set speeds N1 and N4 leads to the drawback that, during a steady-state running condition of the vehicle, operative-to-inoperative switching of sub oil pump S-O/P does not readily occur and thus the operative state is maintained undesirably, thereby resulting in the increased fuel consumption rate and deteriorated durability (short life) of the sub oil pump.

In contrast to the above, during a shift, that is, in the presence of a change in the current transmission ratio CurGP, instead of using the look-ahead input speed Ninf, the oil pump control apparatus of the second embodiment is configured to use a shifting-period look-ahead input speed Nins having a specified characteristic, set such that shifting-period look-ahead input speed Nins is held at a constant speed value equal to the look-ahead input speed Ninf calculated at the shift start point, or such that shifting-period look-ahead input speed Nins is increased at a given ramp gradient from a speed value equal to the look-ahead input speed Ninf calculated at the shift start point. The oil pump control apparatus of the second embodiment is also configured to use again look-ahead input speed Ninf immediately after the shifting-period look-ahead input speed Nins characteristic has crossed the look-ahead input speed Ninf characteristic.

For instance, in the case that there is a change in look-ahead input speed Ninf due to a shift (i.e., a change in the current transmission ratio CurGP) immediately after sub oil pump S-O/P has entered its operative state, the routine of FIG. 6 flows from step S31 through steps S32-S36 to step S37 (see the flow of S31→S32→S33→S34→S35→S36→S37 in FIG. 6). At step S37, the shifting flag FLGcurGP is rewritten from a reset state of FLGcurGP=0 to a set state of FLGcurGP=1. Thereafter, the routine of FIG. 6 flows from step S37 through steps S38-S39 to step S40 (see the further flow of S37→S38→S39→S40 in FIG. 6). At step S38, shifting-period look-ahead input speed Nins, needed for a pump stop decision, is calculated or set, in a manner so as to hold the speed value corresponding to the look-ahead input speed Ninf calculated at the shift start point as a constant shifting-period look-ahead input speed or to increase from the speed value corresponding to the look-ahead input speed Ninf calculated at the shift start point as a given-ramp-gradient shifting-period look-ahead input speed. Next, at step S39, a check is made to determine whether the shifting-period look-ahead input speed Nins becomes greater than or equal to the look-ahead input speed Ninf after shifting-period look-ahead input speed Nins and look-ahead input speed Ninf have crossed each other. On the other hand, at step S40, a check is made to determine whether the backup timer value Tbu of the backup timer, started up from a point of time when the condition defined by Nins<Ninf at step S39 becomes satisfied, is greater than or equal to the set timer value Tbuo.

In the pump control apparatus of the second embodiment, the flow from step S31 through steps S32-S35 and S38-S39 to step S40 in the flowchart of FIG. 6 is continually repeated as far as the speed condition (Nins≧Ninf) of step S39 remains unsatisfied and the backup timer value condition (Tbu≧Tbuo) of step S40 remains unsatisfied (see the flow of S31→S32→S33→S34→S35→S38→S39→S40 in FIG. 6), and as a result of this a decision for a pump stop condition (Ninf≧N4) for sub-oil-pump operative-to-inoperative switching cannot be made. By the way, in making a decision for a pump stop condition (Ninf≧N4), suppose that the shifting-period look-ahead input speed Nins is used instead of using the look-ahead input speed Ninf. In such a case, a pump stop condition (Nins≧N4) cannot be satisfied because of a low speed value of shifting-period look-ahead input speed Nins, in the presence of a change in look-ahead input speed Ninf, caused by a shift (i.e., a change in the current transmission ratio CurGP), immediately after sub oil pump S-OP has entered its operative state. Thus, the logic processing for a pump stop decision, using shifting-period look-ahead input speed Nins in place of look-ahead input speed Ninf, is equivalent to a pump stop decision disabling (inhibiting) process that a decision for a pump stop condition is not executed.

After this, immediately when the speed condition (Nins≧Ninf) of step S39 becomes satisfied or the backup timer value condition (Tbu≧Tbuo) of step S40 becomes satisfied, the routine of FIG. 6 flows from either step S39 or step S40 via step S41 to step S42. At step S42, a check is made to determine whether look-ahead input speed Ninf becomes greater than or equal to the fourth set speed N4 (set as a pump stop decision threshold value). The flow from step S31 through steps S32-S36 to step S42 in the flowchart of FIG. 6 is continually repeated as far as a decision result defined by Ninf<N4 at step S42 remains satisfied (see the flow of S31→S32→S33→S34→S35→S36→S42 in FIG. 6), and as a result the operative state of sub oil pump S-O/P can be maintained. Thereafter, immediately when the pump stop condition defined by Ninf≧N4 at step S42 becomes satisfied, the routine proceeds to step S43. At step S43, operative-to-inoperative switching occurs responsively to a motor stop instruction for sub oil pump S-O/P.

Therefore, in the pump control apparatus of the second embodiment, the look-ahead input speed Ninf can be obtained or calculated by actually converting look-ahead vehicle speed VSPinf (=a look-ahead output speed of automatic transmission AT, predicted in advance) into an input speed of automatic transmission AT by the current transmission ratio CurGP. A pump stop decision for operative-to-inoperative switching of sub oil pump S-O/P is performed, basically utilizing the calculated look-ahead input speed Ninf. Within a range in which a change in look-ahead input speed Ninf occurs due to a shift, a decision for a pump stop condition is not executed. Thus, as seen from the time chart of FIG. 7, after the time t3 when inoperative-to-operative switching of sub oil pump S-O/P has occurred, the operative state can be maintained, thereby effectively preventing undesirable hunting phenomenon for pump control (i.e., repeated switching actions between operative and inoperative states of sub oil pump S-O/P) from occurring.

Additionally, a scheme to enlarge a width of hysteresis between the first set speed N1 (a pump startup decision threshold value) and the fourth set speed N4 (a pump stop decision threshold value) is not adopted, and thus the width of hysteresis can be suppressed to a small width that sub oil pump S-O/P is easy to stop, and also it is possible to avoid an undesirable situation that the operative state of sub oil pump S-O/P is maintained undesirably on a steady-state running condition of the vehicle. As a result, it is possible to improve fuel economy and also to enhance the durability of sub oil pump S-O/P. The other control actions of the pump control apparatus of the second embodiment are similar to those of the first embodiment, and thus detailed description of the other control actions will be omitted.

The oil pump control apparatus of the second embodiment, which is applied to a FR hybrid vehicle, can provide the following effects (8)-(9), in addition to the effects (3)-(6) obtained by the apparatus of the first embodiment.

(8) The electric-motor-driven oil pump control section (electric-motor-driven oil pump control means, see the inoperative-to-operative switching control routine of FIG. 5) is configured to switch the electric-motor-driven oil pump (sub oil pump S-O/P) to the operative state regardless of the look-ahead input speed Ninf, when, under the inoperative state of the electric-motor-driven oil pump (sub oil pump S-O/P), a condition that the actual revolution speed of the input shaft IN of the automatic transmission AT is less than or equal to a third set speed N3, set as a rapid deceleration period sub-oil-pump startup permission decision threshold value, and a condition that the vehicle deceleration rate G is greater than or equal to a third set deceleration rate A3, set as a rapid-deceleration decision threshold value, are both satisfied (see the flow from step S25 to step S29 in FIG. 5).

Therefore, in the case that a remarkable fall in actual revolution speed of the input shaft IN of automatic transmission AT down to an electric-motor-driven-oil-pump startup speed (a pump startup decision threshold value of sub oil pump S-O/P) can be clearly predicted, for instance, when stopping the vehicle with quick braking action from the vehicle decelerating condition, it is possible to suppress a fall in hydraulic pressure to a minimum.

(9) The look-ahead revolution speed calculation section (look-ahead revolution speed calculation means, i.e., steps S31 to S34 in FIG. 6) is configured to arithmetically calculate, based on information regarding a vehicle speed (VSP) and a vehicle deceleration rate (G), the look-ahead vehicle speed (VSPinf), which may occur the given elapsed time later, and comprises an arithmetic-calculation section (look-ahead input speed calculation means) for arithmetically calculating and estimating a look-ahead input speed Ninf of the input shaft IN, which look-ahead input speed may occur the given elapsed time later, by converting the look-ahead vehicle speed (VSPinf) into an input speed by a transmission ratio (the current transmission ratio CurGP) of the automatic transmission AT, the electric-motor-driven oil pump control section (electric-motor-driven oil pump control means, i.e., steps S35 to S43 in FIG. 6) comprises a pump stop decision section (pump stop decision means, i.e., step S42 in FIG. 6) configured to switch the electric-motor-driven oil pump (sub oil pump S-O/P) to the inoperative state, when, under the operative state of the electric-motor-driven oil pump (sub oil pump S-O/P), the look-ahead input speed Ninf becomes greater than or equal to a fourth set speed N4 higher than the first set speed, and the electric-motor-driven oil pump control section (electric-motor-driven oil pump control means) is further configured to set, in a specific situation where the look-ahead input speed Ninf becomes greater than or equal to the fourth set speed N4 due to a shift of the automatic transmission AT, a shifting-period look-ahead input speed Nins, needed for a pump stop decision, in a manner so as to hold a speed value corresponding to the look-ahead input speed Ninf calculated at a shift start point as a constant shifting-period look-ahead input speed or to increase from the speed value corresponding to the look-ahead input speed Ninf calculated at the shift start point as a given-gradient shifting-period look-ahead input speed, and also configured to disable the pump stop decision of the pump-stop decision section (pump stop decision means, i.e., step S42 in FIG. 6) to be executed until such time that the set shifting-period look-ahead input speed Nins becomes greater than or equal to the look-ahead input speed Ninf.

Therefore, it is possible to prevent undesirable hunting phenomenon for pump control (i.e., repeated switching actions between operative and inoperative states of sub oil pump S-O/P), which may occur by the use of look-ahead input speed Ninf, changing due to a shift (i.e., a change in the current transmission ratio CurGP. Additionally, it is possible to suppress the width of hysteresis between the first set speed N1 (a pump startup decision threshold value) and the fourth set speed N4 (a pump stop decision threshold value) to a small width that the electric-motor-driven oil pump (sub oil pump S-O/P) is easy to stop.

Third Embodiment

Figure 8:
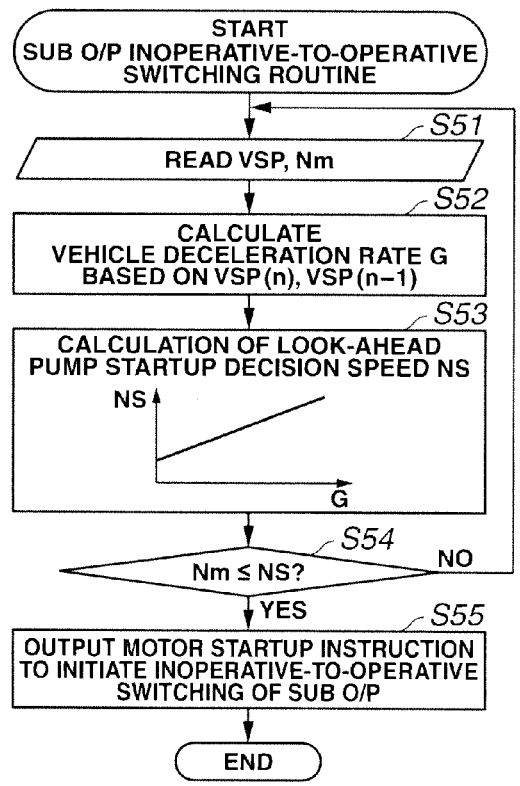
FIG. 8 is a flowchart illustrating a sub-oil-pump inoperative-to-operative switching routine of oil pump control processing executed within the AT controller incorporated in the control system of the third embodiment.

Referring now to FIG. 8, there is shown a further modified oil pump control routine (a sub-oil-pump inoperative-to-operative switching routine) executed by the processor of AT controller 7 incorporated in the control system of the third embodiment. In the first and second embodiments, information about an actual input speed (=motor speed Nm), corresponding to an actual revolution speed of input shaft IN of automatic transmission AT, is looked ahead as a look-ahead input speed Ninf (i.e., a future transmission input speed). In contrast, in the third embodiment, information about a pump startup decision threshold value (in other words, a pump startup decision speed) itself is looked ahead as a look-ahead sub O/P startup decision speed NS (simply, a look-ahead pump startup decision speed). Details of respective steps S51-S55 of the further modified sub-oil-pump inoperativeto-operative switching routine (corresponding to the look-ahead vehicle speed estimation means, the second oil pump control means) is hereunder described in reference to the flowchart of FIG. 8.

At step S51, vehicle speed VSP from vehicle speed sensor 17 and motor speed Nm from motor speed sensor 21 are read. Thereafter, step S52 occurs.

At step S52, an infinite difference between a vehicle speed VSP(n) read at the current execution cycle and a vehicle speed VSP(n−1) read at the previous execution cycle (before one execution cycle) is arithmetically calculated by a differential operation, to obtain a vehicle deceleration rate G, and then step S53 occurs.

At step S53, look-ahead pump startup decision speed NS is arithmetically calculated or retrieved, based on the calculated vehicle deceleration rate G, from a preprogrammed G-NS characteristic map showing how look-ahead pump startup decision speed NS has to be varied relative to vehicle deceleration rate G. As can be appreciated from the preprogrammed G-NS characteristic map of step S53 of FIG. 8, the G-NS characteristic map is preprogrammed, such that look-ahead pump startup decision speed NS becomes a minimum speed value at a zero vehicle deceleration rate (i.e., G=0) and look-ahead pump startup decision speed NS increases in proportion, as vehicle deceleration rate G increases. After step S53, step S54 occurs.

At step S54, a check is made to determine whether an actual input speed (=motor speed Nm) corresponding to an actual revolution speed of input shaft IN of automatic transmission AT is less than or equal to the look-ahead pump startup decision speed NS, calculated through step S53. When the answer to step S54 is in the affirmative (YES), that is, when Nm≤NS, the routine proceeds to step S55. Conversely when the answer to step S54 is in the negative (NO), that is, when Nm>NS, the routine returns to step S51.

At step S55, a decision result defined by Nm≤NS at step S54, a motor startup instruction for sub oil pump S-O/P is outputted and thus inoperative-to-operative switching of sub oil pump S-O/P occurs. In this manner, one execution cycle of the sub-oil-pump inoperative-to-operative switching routine ends.

The system configuration of the third embodiment is also similar to that of the first embodiment (see FIG. 1), and thus detailed explanation of the system configuration of the third embodiment will be omitted because the above description thereon seems to be self-explanatory.

Details of the operation (in particular, sub-oil-pump inoperative-to-operative switching control action) of the oil pump control apparatus of the third embodiment, which is applied to the FR hybrid vehicle, are hereunder described in detail.

[Inoperative-to-Operative Switching Control Action of Sub Oil Pump S-O/P]

In the oil pump control apparatus of the third embodiment, look-ahead control action for a pump startup decision threshold value (in other words, a pump startup decision speed NS), needed to determine which timing a startup of sub oil pump S-O/P should be permitted at, and used for comparison with an input speed (an actual revolution speed of input shaft IN of automatic transmission AT), corresponding to a pump speed of mech. oil pump M-O/P, is performed. In more detail, the pump startup decision speed NS of sub oil pump S-O/P (the pump startup decision threshold value) can be predicted or estimated in advance depending on a vehicle deceleration rate G. Thus, it is possible to prevent a lag in a development (a buildup) of hydraulic pressure produced by sub oil pump S-O/P, while preventing or suppressing sub oil pump S-O/P from being wastefully operated. The inoperative-to-operative switching control action of sub oil pump S-O/P is hereinafter described in detail in reference to FIG. 8.

In the case that the running condition of the vehicle is a constant-speed running condition or a deceleration condition, the routine of FIG. 8 flows from step S51 through steps S52-S53 to step S54 (see the flow of S51→S52→S53→S54 in FIG. 8). At step S52, vehicle deceleration rate G is arithmetically calculated, and thereafter at the next step S53 look-ahead pump startup decision speed NS is arithmetically calculated based on the calculated vehicle deceleration rate G. After this, the flow from step S51 through steps S52-S3 to step S54 in the flowchart of FIG. 8 is continually repeated as far as step S54 determines that the actual input speed Nm exceeds the look-ahead pump startup decision speed NS (see the flow of S51→S52→S53→S54 in FIG. 8). Thereafter, immediately when the actual input speed Nm becomes less than or equal to the look-ahead pump startup decision speed NS, the routine of FIG. 8 proceeds from step S54 to step S55, so as to initiate inoperative-to-operative switching of sub oil pump S-O/P responsively to a motor startup instruction for sub oil pump S-O/P.

In the inoperative-to-operative switching control action of the third embodiment, based on look-ahead pump startup decision speed NS, the G-NS characteristic is preprogrammed or set, such that look-ahead pump startup decision speed NS is calculated as a minimum speed value at a zero vehicle deceleration rate (i.e., G=0) and look-ahead pump startup decision speed NS is calculated as a speed value increasing in proportion, as vehicle deceleration rate G increases.

Therefore, during a moderate deceleration condition that there is a margin in time until a lack in discharge pressure from mech. oil pump M-O/P occurs, look-ahead pump startup decision speed NS tends to become a low speed value, because of a small vehicle deceleration rate. Hence, in combination with such a margin in time for a lack in discharge pressure, inoperative-to-operative switching of sub oil pump S-O/P tends to occur slowly, while waiting for a moderate drop in the actual input revolution speed of automatic transmission AT down to the low look-ahead pump startup decision speed NS. That is, it is possible to avoid sub oil pump S-O/P from being wastefully started up, thus improving fuel economy and also preventing a deterioration in electric power consumption and overheating of the pump motor owing to the continuous operation of the sub oil pump.

On the other hand, during a rapid deceleration condition that there is a less margin in time until a lack in discharge pressure from mech. oil pump M-O/P occurs, look-ahead pump startup decision speed NS tends to become a high speed value, because of a great vehicle deceleration rate. Hence, in combination with such a less margin in time for a lack in discharge pressure, inoperative-to-operative switching of sub oil pump S-O/P tends to occur at an earlier time, since the actual input revolution speed of automatic transmission AT rapidly reaches the high look-ahead pump startup decision speed NS. That is, it is possible to start up sub oil pump S-O/P at an earlier time that can compensate for a lag time in a hydraulic pressure build-up of working oil discharged from sub oil pump S-O/P, thereby preventing a fall (or a lack) in hydraulic pressure. The other control actions of the pump control apparatus of the third embodiment are similar to those of the first embodiment, and thus detailed description of the other control actions will be omitted.

The oil pump control apparatus of the third embodiment, which is applied to a FR hybrid vehicle, can provide the following effect (10), in addition to the effect (1) obtained by the apparatus of the first embodiment.

(10) The friction engagement element comprises a clutch (the second clutch CL2) installed in the automatic transmission AT, the rotating member comprises an input shaft IN of the automatic transmission AT, the look-ahead revolution speed calculation section (look-ahead revolution speed calculation means, i.e., steps S51 to S53 in FIG. 8) comprises an arithmetic-calculation section (look-ahead pump startup decision speed calculation means) for arithmetically calculating and estimating, based on a vehicle deceleration rate G, a look-ahead pump startup decision speed (a look-ahead sub O/P startup decision speed NS), needed to determine whether which timing a startup of the electric-motor-driven oil pump (sub oil pump S-O/P) should be permitted at, and the electric-motor-driven oil pump control section (electric-motor-driven oil pump control means, i.e., steps S54-S55 in FIG. 8) is configured to switch the electric-motor-driven oil pump (sub oil pump S-O/P) to the operative state, when, under the inoperative state of the electric-motor-driven oil pump (sub oil pump S-O/P), the actual revolution speed of the input shaft IN of the automatic transmission AT becomes less than or equal to the look-ahead pump startup decision speed (look-ahead sub O/P startup decision speed NS).

Therefore, in the vehicle (a FR hybrid vehicle) having a drive drain that the mechanical oil pump (mech. oil pump M-O/P) is installed on the input shaft IN of the automatic transmission AT, by virtue of the look-ahead processing of pump startup decision speed information needed for a startup decision for inoperative-to-operative switching of the electric-motor-driven oil pump (sub oil pump S-O/P), based on the vehicle deceleration rate G, it is possible to prevent the electric-motor-driven oil pump (sub oil pump S-O/P) from being wastefully driven even during a moderate deceleration condition, and further to prevent a lack in hydraulic pressure to be supplied to the friction engagement element even during a rapid deceleration condition.

In the first, second, and third embodiments, the oil pump control apparatus is exemplified in an automotive vehicle employing, in a drive train, a stepped automatic transmission whose number of speeds is limited or finite. In lieu thereof, the oil pump control apparatus of each of the first to third embodiments may be applied to an automotive vehicle employing, in a drive train, a continuously variable automatic transmission whose transmission ratio is steplessly variable. Alternatively, the oil pump control apparatus of each of the first to third embodiments may be applied to an automotive vehicle using a hydraulically-operated start-up clutch. without employing, in a drive train, an automatic transmission.

In the first, second, and third embodiments, the oil pump control apparatus is exemplified in a front-engine rear-drive (FR) hybrid electric vehicle (HEV). The inventive concept concerning the oil pump control apparatus is not limited to the particular embodiments shown and described herein. The inventive concept may be applied to various types of automotive vehicles, front-engine front-drive (FF) hybrid electric vehicles (HEVs), electric vehicles (EVs), fuel-cell vehicles (FCVs), idle-stop-control-system equipped automotive vehicles, and the like. That is, the inventive concept can be applied to any types of automotive vehicles, which uses a second oil pump, together with a first oil pump, to compensate for a lack in discharge pressure from the first oil pump by operating the second oil pump.

The entire contents of Japanese Patent Application No. 2009-232453 (filed Oct. 6, 2009) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An oil pump control apparatus of a vehicle comprising:
a first oil pump driven by a first driving power source configured to propel the vehicle;
a second oil pump driven by a second driving power source;
a hydraulically-operated portion that is supplied with working oil from the first and second oil pumps;
a look-ahead vehicle speed estimation section configured to estimate, based on both a vehicle speed and a vehicle deceleration rate, a look-ahead vehicle speed that is estimated in the look-ahead vehicle speed estimation section to occur after a given elapsed time;
a second-oil-pump control section configured to:
predict, based on both the look-ahead vehicle speed and the vehicle deceleration rate, whether a lack in discharge pressure produced by the first oil pump driven by the first driving power source from a required hydraulic pressure needed for the hydraulically-operated portion occurs, and
start the second oil pump, when the second-oil-pump control section predicts that the lack in discharge pressure produced by the first oil pump from the required hydraulic pressure occurs;
a look-ahead revolution speed calculation section configured to arithmetically calculate and estimate, based on the look-ahead vehicle speed, a look-ahead revolution speed of a rotating member having a driving-connection with the first oil pump, wherein:
the look-ahead revolution speed is calculated and estimated in the look-ahead revolution speed calculation section to occur after the given elapsed time,
the hydraulically-operated portion comprises a friction engagement element, the friction engagement element and the rotating member being provided on a power-transmission path between the first driving power source and drive road wheels such that engagement-disengagement states of the friction engagement element are switched by the working oil from at least one of the first and second oil pumps,
the first oil pump comprises a mechanical oil pump laid out to be offset toward the first driving power source on the power-transmission path from the friction engagement element,
the mechanical oil pump is driven by the rotating member provided on the power-transmission path and is configured to supply the working oil to the friction engagement element,
the second oil pump comprises an electric-motor-driven oil, pump,
the second driving power source comprises an electric motor configured to drive the electric-motor-driven oil pump,
the second-oil-pump control section comprises an electric-motor-driven oil pump control section configured to control switching between an operative state and an inoperative state of the electric-motor-driven oil pump,
the electric-motor-driven oil pump control section is configured to:
make a startup decision for inoperative-to-operative switching of the electric-motor-driven oil pump, based on both the look-ahead revolution speed and the vehicle deceleration rate, and initiate the inoperative-to-operative switching of the electric-motor-driven oil pump when a result of the startup decision is affirmative, the friction engagement element comprises a clutch installed in an automatic transmission, the rotating member comprises an input shaft of the automatic transmission, the look-ahead revolution speed calculation section comprises a look-ahead input speed arithmetic-calculation section configured to arithmetically calculate and estimate, based on an actual revolution speed of the input shaft and the vehicle deceleration rate, a look-ahead input speed of the input shaft, the look-ahead input speed is calculated and estimated in the look-ahead input speed arithmetic-calculation section to occur after the given elapsed time, and the electric-motor-driven oil pump control section is configured to switch the electric-motor-driven oil pump to the operative state, when, under the inoperative state of the electric-motor-driven oil pump, the look-ahead input becomes less than or equal to a first set speed that is set as an under-developed pump discharge pressure decision threshold value.

2. The oil pump control apparatus as claimed in claim 1, wherein the electric-motor-driven oil pump control section is configured to:

switch the electric-motor-driven oil pump to the operative state, when, under a condition where the vehicle deceleration rate is greater than or equal to a first set deceleration rate that is set as a look-ahead decision threshold value, the look-ahead input speed becomes less than or equal to the first set speed that is set as the under-developed pump discharge pressure decision threshold value, and switch the electric-motor-driven oil pump to the operative state, when, under a condition where the vehicle deceleration rate is less than the first set deceleration rate that is set as the look-ahead decision threshold value, the actual revolution speed of the input shaft of the automatic transmission becomes less than or equal to the first set speed that is set as the under-developed pump discharge pressure decision threshold value.

3. The oil pump control apparatus as claimed in claim 1, wherein the electric-motor-driven oil pump control section is configured to switch the electric-motor-driven oil pump to the inoperative state, when, under the operative state of the electric-motor-driven oil pump, a specific situation where the actual revolution speed of the input shaft of the automatic transmission becomes less than or equal to the first set speed that is set as the under-developed pump discharge pressure decision threshold value, remains unexperienced after the inoperative-to-operative switching of the electric-motor-driven oil pump has occurred, and when the vehicle deceleration rate becomes less than a second set deceleration rate that is set as a non-deceleration condition decision threshold value.

4. The oil pump control apparatus as claimed in claim 1, wherein the electric-motor-driven oil pump control section is configured to switch the electric-motor-driven oil pump to the inoperative state regardless of the vehicle deceleration rate, when, under the operative state of the electric-motor-driven oil pump, a specific situation where the actual revolution speed of the input shaft of the automatic transmission becomes less than or equal to the first set speed that is set as the under-developed pump discharge pressure decision threshold value has been experienced after the inoperative-to-operative switching of the electric-motor-driven oil pump has occurred, and when the actual revolution speed of the input shaft of the automatic transmission exceeds a second set speed that is set as a pump stop decision threshold value.

5. The oil pump control apparatus as claimed in claim 1, wherein the electric-motor-driven oil pump control section is configured to switch the electric-motor-driven oil pump to the operative state regardless of the look-ahead input speed, when, under the inoperative state of the electric-motor-driven oil pump, the vehicle deceleration rate becomes greater than or equal to a third set deceleration rate that is set as a rapid-deceleration decision threshold value.

6. The oil pump control apparatus as claimed in claim 1, wherein the electric-motor-driven oil pump control section is configured to switch the electric-motor-driven oil pump to the operative state regardless of the look-ahead input speed, when, under the inoperative state of the electric-motor-driven oil pump, a first condition and a second condition are both satisfied, wherein, in the first condition, the actual revolution speed of the input shaft of the automatic transmission is less than or equal to a third set speed that is set as a rapid deceleration period sub-oil-pump startup permission decision threshold value, and wherein, in the second condition, the vehicle deceleration rate is greater than or equal to a third set deceleration rate that is set as a rapid-deceleration decision threshold value.

7. The oil pump control apparatus as claimed in claim 1, wherein the electric-motor-driven oil pump control section comprises a pump stop decision section configured to switch the electric-motor-driven oil pump to the inoperative state, when, under the operative state of the electric-motor-driven oil pump, the look-ahead input speed becomes greater than or equal to a fourth set speed higher than the first set speed, and wherein the electric-motor-driven oil pump control section is further configured to:

set, in a specific situation where the look-ahead input speed becomes greater than or equal to the fourth set speed due to a shift of the automatic transmission, a shifting-period look-ahead input speed needed for a pump stop decision so as to hold a speed value corresponding to a constant shifting-period look-ahead input speed calculated at a shift start point or to increase from a speed value corresponding to a given-gradient shifting-period look-ahead input speed calculated at the shift start point, and disable the pump stop decision of the pump stop decision section to be executed until such time that the set shifting-period look-ahead input speed becomes greater than or equal to the look-ahead input speed.

* * * * *